US006609114B1

(12) United States Patent
Gressel et al.

(10) Patent No.: US 6,609,114 B1
(45) Date of Patent: *Aug. 19, 2003

(54) SYSTEM FOR SAFE COLLECTION OF PAYMENT INCLUDING ELECTRONIC PAYMENT RECEIPT GENERATORS HAVING ELECTRONIC PURSES

(75) Inventors: Carmi David Gressel, Kibbutz Urim (IL); David Milstein, Beer Sheva (IL); Avi Sander, Kiryat Gat (IL); Isaac Hadad, Beersheva (IL); Ran Granot, Yavneh (IL)

(73) Assignee: M-System Flash Disk Pioneers Ltd., Kfar Saba (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,060

(22) Filed: Oct. 22, 1997

(30) Foreign Application Priority Data

Oct. 24, 1996 (IL) .................................................. 119486

(51) Int. Cl.[7] .............................................. G06F 17/60

(52) U.S. Cl. ......................................................... 705/50

(58) Field of Search ............................. 705/41, 39, 44, 705/13, 40, 80, 34, 64–66, 76, 50, 18; 235/384; 340/825.35

(56) References Cited

U.S. PATENT DOCUMENTS

| 4,804,825 | A | * | 2/1989 | Bitoh ........................... 235/380 |
| 5,315,510 | A | * | 5/1994 | Kimura et al. ................. 705/18 |
| 5,577,121 | A | * | 11/1996 | Davis et al. ................... 380/24 |
| 5,623,547 | A | * | 4/1997 | Jones et al. ................... 380/24 |
| 5,677,955 | A | | 10/1997 | Doggett et al. ............... 705/76 |

FOREIGN PATENT DOCUMENTS

JP         3092966 A    *  4/1991

OTHER PUBLICATIONS

Bennet, Julie; GFI–Genfare collection system will ease New Yorkers' paths; Dec. 1990; Crain's Chicago Business, p 40; DialogWeb copy pp. 1–2.*

Schneier, B. Applied Cryptography, Second Edition, John Wiley & Sons, New York, 1996, pp. 139–146.

"Integrated Circuit Card Specifications for Payment Systems", Version 3, Jun. 30, 1996, Published and Distributed By EMV (Europay MasterCard Visa).

* cited by examiner

Primary Examiner—Thomas A. Dixon
(74) Attorney, Agent, or Firm—Ladas & Parry

(57) ABSTRACT

A system for safe collection of payment by a vehicle operator from riders, the system including a multiplicity of electronic payment receipt generators, each operable by a vehicle operator, wherein each individual one of the payment receipt generators includes an electronic purse storing an amount of electronic cash, each electronic purse including an electronic cash loader operative to use some of the electronic cash to generate a payment receipt to be given by the vehicle operator to a rider, and an electronic purse control unit operative to prevent said electronic cash loader from exceeding said amount of electronic cash, thereby limiting the vehicle operator's entitlement to collect payments from riders, and an electronic cashier purse operative to increment the electronic purse of each electronic payment receipt generator by the amount of payment collected by the vehicle operator to whom the electronic payment receipt generator is assigned.

8 Claims, 17 Drawing Sheets

Microfiche Appendix Included
(3 Microfiche, 110 Pages)

| | LOAD/UNLOAD | | REGULAR | |
|---|---|---|---|---|
| PARKING METER INCREMENT TABLE STRATEGY SUGGESTION | | | | |
| I | MIN(I) | PM_INC(I) | MIN(I) | PM_INC(I) |
| 0 | 15 | $0.10 | 30 | $0.50 |
| 1 | 15 | 0.90 | 30 | 1.00 |
| 2 | 30 | 5.00 | 60 | 3.00 |
| 3 | 60 | 6.00 | 60 | 4.50 |
| 4 | 60 | 10.00 | 60 | 6.00 |
| 5 | 60 | 20.00 | 60 | 7.00 |
| 6 | 60 | 20.00 | 60 | 8.00 |
| 7 | 60 | 20.00 | 60 | 10.00 |
| 8 | 120 | 40.00 | 60 | 12.00 |

FIG 8B

TRANSACTION TERMINAL

READER A     READER B     [ EXECUTE ]

| | READER A | READER B |
|---|---|---|
| NAME: | MOSHE NUN | DAVID YAARI |
| TYPE: | ACCOUNTANT | TREASURER |
| ID: | 027972178 | 4643723673 |
| VALIDITY: | 1/1/90-2/2/97 | 2/2/91-3/3/98 |

TRANSACTION AMOUNT
[                    ]

TRANSACTION DETAILS

```
17/10/96 17:31 $10020.00
```

○ CREDIT FOR CASH RECEIVABLES
○ GENERATE RCCCR
○ GENERATE RR
○ GENERATE BANK APPROVAL
○ DEPOSIT APPROVED RCCCRS
○ GENERATE CHEQUE (CCCR)
○ DEPOSIT CHEQUE (CCCR)
● VIEW PURSE BALANCE (CCR)

FIG. 15

CARD ISSUING FORM

| | | | |
|---|---|---|---|
| NAME: | MOSHE DUGRI | I.D.: | 027972176 |
| TYPE: | ACCOUNTANT | TRANSACTION LIMIT: | 1000 |

VALIDITY DATE: 10/16/96

EXPIRY DATE: 10/23/97

P.I.N. (4 DIGITS): 1234

PERSONALIZE     EXIT

FIG. 16

SYSTEM FOR SAFE COLLECTION OF PAYMENT INCLUDING ELECTRONIC PAYMENT RECEIPT GENERATORS HAVING ELECTRONIC PURSES

SUMMARY OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the present specification and claims, the following terminology is employed:

An entity is considered to have "a credit of X dollars for cash receivables", also termed herein AMT, or "X$ of CCRs", if he has been granted the right to accept X dollars in cash.

The term "cash" or "$CASH" refers to physical money as opposed to other vehicles by which payment can be made such as electronic money, credit cards, cheques, bank transfers and the like.

A client of a system which provides services in return for payment is an entity which pays the system and, in return, receives a service. For example, the passengers of a transportation system are the transportation system's clients.

The term "purse" is used to denote a payment manipulating element. A "client's purse" is a purse belonging to a client which holds a certain amount of value, either cash or virtual value, which the client may use to pay the system. A "system element's purse" is a purse belonging to an element of the system, such as one of elements 20, 60, 70, 80, etc., which holds a credit for cash receivables, i.e. an entitlement to receive physical cash.

The following abbreviations and notations are employed in the present specification. The definitions provided herein refer only to a preferred embodiment of the present invention and are not intended to be limiting.

$CASH—Bills and coins (physical cash), normally used as legal tender.

Acquirer—Bank or other Issuer who clears transactions.

a Alpha—the first letter of the Greek alphabet.

A (a)

AAC Application Authentication Cryptogram—A response sent by the SAM/SC indicating a rejection of a transaction.

AAR Application Authorization Referral—A response sent by the SAM/SC indicating a request for a referral.

AC Application Cryptogram—A cryptogram sent by the SAM/SC indicating the state of a transaction.

ACC Application Currency Code—Identifies what currency is used in a transaction

ACN Account Number—A unique number identifying smart card's account with an issuer. See PAN.

ACK Acknowledgment—Confirmation of acceptance of transmission. Application Default Action—A data element indicating the action a card should take for certain exceptional conditions.

ADF Application Definition File—A file that contains data which defines application properties.

AED Application Expiration Date—A closure date after which application may cease to be valid.

AEF Application Elementary File—A basic file that contains data which can be used by the SAM/SC.

Application Elementary File Data Template—Attributes of a file stored in the FCI.

Application Effective Date—Starting Date from which the application may be used.

AFL Application File Locator—A string divided into fields of typically four bytes, pointing to file and record numbers, containing relevant application information.

AID Application Identifier—Identifies the application as described in ISO 7816-5, comprises the RID and the PIX.

ISO7816—The set of standards for manufacturing ICCs. Serves as basis for most other Parts 1+5 standards.

AIP Application Interchange Profile—Indicates capabilities of the card.

AMD Application Management Data—

AMT Amount of Transaction—A Binary Coded Decimal, exact to 1/100, in the present example.

[$AMT_{XY}$] Subscript DP signifies the amount to be collected by a parking meter for parking until the end of the regulated parking day, e.g., parking may be free from 7:00 PM.

Else, subscript XY signifies AMT transferred from X to Y.

an Alphanumeric—A data sequence which may represent letters, punctuation marks, and numbers (characters). ASCII is for alphanumerics.

ans Alphanumeric Special—

APC Automatic Passenger Counting system—an electronic system which audits the number of passengers in an autobus.

APDU Application Protocol Data Unit—A command response, data template or data structure AR Account Receivables—an archive of completed transactions, preferably with PK proof, typically with identification and time of transaction. The account receivable archive is external to the SAM; as opposed to the CAR, the credit for accounts receivable, which may only be a PK protected re Archive File (Cryptographically Linked)—A working file which is composed of data fields which are linked together in a fashion such that removal of or alteration of data in any Archive File field can be detected.

Asymmetric (PKC)—Public Key Cryposystems where all subscribers have unique (not shared) secret keys and unique, universally available public identifiers.

ARPC Authorization Response Cryptogram—A response, sent by the issuer, upon receipt of an ARQC, which proves its authenticity.

ARQC Authorization Request Cryptogram—A response, sent by the card, indicating a request to go on-line.

ATC Application Transaction Counter—The transaction numerator which is incremented at every transaction performed by a SAM/SC.

ATM Automated Teller Machine—A remote banking machine for distributing money and performing other functions generally performed by a human bank teller. (Banking)

ATM Automatic Ticketing Machine—see TIM

ATR Answer to Reset—A data string emitted by a smart card ICC at reset, to supply information, e.g., the type of circuit, operating system ID, communication parameters, etc.

Auth. Authentication—proving the validity and acceptance of liability to a string of data (certificate), usually to prove identity of a device, either as a preamble to a transaction or as a control to access.

b Binary—An Integer number system where all numbers are represented by strings of modulo 2 digits (bits), e.g., each digit is either a one or a zero. The string 1011 is equal to $2^3+2^1+2^0=11$.

BAL Balance in a purse

BCD Binary Coded Decimals—A binary code where each decimal digit is represented by a nibble (4 bits). bit—a binary digit, i.e. a bit can be equal to a one or a zero.

BER-TLV Basic Encoding Rules Tag Length Value

BGT Block Guard Time—see T=1 timing.

BIN Base Identification Number—Blind transfer. Sending an electronic transaction over an open channel, without first establishing a formal link with a second party, e.g., depositing an electronic cheque in a mailbox, without explicitly communicating with the recipient, while enabling the recipient of the transfer to credit his internal purse without performing a clearance via a trusted third party, e.g., a bank, Visa, etc.

See CCCR and RCCCR.

bus (Motorola often prints buss)—an internal data channel which connects a

CPU with its peripherals.

BUI Bus (Autobus) Interface Unit—Connects the TIM's bus peripherals, power supply, network interface, etc. to the TIM's motherboard.

BWI Block Waiting time Integer—see T=1 timing.

BWT Block Waiting Time—see T=1 timing.

C-APDU Command APDU—for T=0 timing—Command+ Data sent from an application to the TTL.

CAR Credit for Accounts Receivables—The mechanism, (very similar to the CCR), meant to control account value (generally electronic) received and transferred by SAM/SCs. Generally, such value will be handled by a central clearance organization (see acquirer). When electronic value is accepted by a SAM/SC, e.g., a vending machine, a TIM, a parking meter, following rules established by the SC issuer, the SAM/SC's CAR is decremented. Means and methodology in this document with relation to transfers of CCRs may be applicable with CARs. However, the motivation for full authentication of the terminal to the SAM/SC is diminished by the inherent delay in debiting and crediting ECASH, and the decreased value of ECASH to a rogue or a rogue organization, owing to the traceability of an ECASH transaction, and the efficient clearance abilities of the acquirer.

For example a cash advance public key smart card parking transaction is demonstrated;

assuming that all financial service and handling charges between a parking meter (PM) operator, an ECASH purse operator and credit card applications are reconciled on a monthly basis, and that these service charges are not relevant to the transactions involved; and assuming that the client who is paying for parking services (the cardholder) has two applications, a public key credit smart card, and a public key ECASH smart card, either on the same smart card or on two separate public key SAM/SCs, preferably both able to authenticate to the PM that they have the same owner;

and assuming here, entitlement to load ECASH into a client's purse (tantamount to printing electronic money) is granted to a secured PM, where the source of the payment is a client's credit card giving a "cash advance", and assuming that the PM operator's strategy for risk assessment, in addition or in place of the EMV strategy for off-line assessment of risk collections, is to allow a cash advance only for the exact amount necessary to pay for parking for a full day ($AMT_{DP}$), (about $40), and for only one cash advance per day without going on-line and that it immediately charges for the first double time increment, and will only return the surplus when the client returns to take his vehicle, and no sooner than 15 minutes from the client's initializing of the transaction;

as the meter receives $AMT_{DP}$ from the client's SC credit card, the meter's credit receivables purse is incremented; the PM's CCR entitlement is decremented; as the TPMP is incremented by $AMT_{DP}$; and the TPMP purse is immediately decremented by the PM_INC's first two increments of ECASH reducing the CAR by the same amount and incrementing the accounts receivables (AR) purse by the same sum;

subsequent time increments elapsing before the return of the client with his SC will activate additional incremental transfers from the TPMP to the AR purse, and decrements from the entitling CAR;

when the client returns to retrieve his vehicle, he inserts his smart card; the TPMP is entitled to return to the cardholder the remainder of the ECASH left in the TPMP from the credit card cash advance to replenish the cardholder's ECASH purse; the total parking transaction is archived in the accounts receivable purse.

Assume that there was only this single parking transaction, and that the meter accepted $16 for parking, and received a cash advance of $40 from the credit card application. The PM would have returned $24 to the cardholder's ECASH purse; used $40 of the PM's entitlement; taken $40 of credit receivables to be given eventually to the ECASH purse operator who would use it to dun the credit card acquirer, and $16 of accounts receivable to be used by the PM operator to dun the purse operator for parking services.

When servicing the PM, the warden's terminal would unload the PM's CRs into its own CR purse, decrement the warden's CCRs by $40 to replenish the PM's CCR back to the PM's maximum CCR entitlement; and then unload the $16 of ECASH from the PM's AR purse, into its own AR purse, decrementing the warden's CAR and incrementing the PM's CAR by $16, to return the CAR to its maximum entitlement.

When the Warden or RF network connection "duns" the meter, the warden's "dunning" terminal archives and transmits proof of ARs collected (parking tariff) to the operator's accounting system and ECASH reloaded in client purses.

Cashback—the ability to cancel a transaction and return value. In the normal merchant client transaction an option can be allowed to cancel the last transaction in a client's card, if and only if the request is for cancelling the very last transaction.

Cashback Purse—In the driver traveller scheme, a preferred feature is cancelling of a hardcopy ticket purchased with $CASH. The specification preferably allows the driver the option of returning full or part fare in $CASH to a traveller if a claim is made in reasonable time, e.g. a traveller who took a bus in the wrong direction and realized his mistake in the first one-half hour of the trip.

E.g., for this purpose, the OPM also has a Cashback Purse which is incremented with Cashback Credit each instance that the driver prints a cashback receipt on the TIM. When the driver reconciles $CASH and CCRs with an entitled acceptor of cashback credit, e.g. a depot treasurer, he deposits cashback credits and $CASH with the depot treasurer and receives CCRs equal to the sum of cashback and $CASH. Such an entitled cashback credit acceptor is enabled to decrement his CCR purse with the cashback credits received from the driver.

The cashback purse preferably contains a cumulative register which sums all cashbacks from a start date, as a measure of merit for a driver. (A large sum in the cashback summation may signify suspected fraud.)

Cashiers, Depot—Acceptors of moneys from drivers. Depot Cashiers deposit their collected funds with the Depot Treasurer At present, Depot Cashiers are sellers of tickets to drivers. In some depots, the treasurer may also act as a depot cashier.

Cashiers, Ticket—Sellers of tickets to passengers at depots. Also have TIMs and OPMs.

CBC Cipher Block Chaining—A typical feedback mode of DES En/Decryption wherein many blocks of data are sent, often quite similar messages are dispersed to varied recipients. Here the results of one encryption are XORed to the following block. Any change in the first block will assure non-identical encryption of following blocks, should the following data be identical.

CCCR Cheque for Credit for Cash Receivables—A cheque sent over an open channel to replenish CCRs without handshake, as opposed to a purse to purse CCR transaction, wherein two SAM/SCs communicate in a handshaking protocol. The CCCR can only be deposited once, and only by the recipient whose PAN and ATC numbers appeared in the RCCCR. See CCR and RCCCR.

CCR Credit for $CASH Receivables—the credit limiting license granted to a system employee or device to collect $CASH or $CASH equivalent (e.g. a "cash advance from a credit card"), from consumers. This credit is held in a purse in a SAM/SC, protected by strong PKC.

In the system steady state, in a one to one transaction, these credits can only be incremented in one purse if decremented by the same amount from another system purse.

When a vendor accepts AMT of $CASH for the system from a consumer the vendor's CCR is decremented by AMT and he typically executes a system "purchase" in order to decrement his CCR. An example of such a purchase; in a purse to purse transaction with a consumer's purse in a CSC, a lottery ticket seller, who is entitled to load ECASH in CSCs, accepts AMT of $CASH, wherein he increments AMT of ECASH in the client's CSC, he purchased ECASH from the system (e.g. the client's ECASH purse), while decrementing his CCR by AMT. His CCR may subsequently be replenished by a CCCR sent to him by electronic mail, after he has deposited $CASH at his local bank.

In transactions between system employees, where $CASH is handed from one to another, reconciliation is executed purse to purse, wherein the recipient of the $CASH's purse is decremented, and the depositing employee's purse is incremented.

To demonstrate another such $CASH transaction; a driver deposits AMT of $CASH receipts with a cashier. The cashier accepts the $CASH; during the transaction the cashier's CCR purse is decremented by AMT, and the driver's purse is replenished by AMT.

CCR can also be incremented with receipt of a CCCR. When the (payer) sender of a CCCR writes the cheque, his CCR is reduced by the equivalent amount. CCRs are only legal tender between system employees or agents, and can only be transferred between SSCs.

A vital link in the CCR mechanism is the use of a REC (an electronic $CASH receipt from a bank or similar repository), wherein the bank signs a receipt for the $CASH deposited. Typically, this receipt can be converted to CCRs only by an entitled entity, e.g., an accountant who can reconcile such RECs with accounts received from the banks and hardcopy receipts sent via internal mail.

CCPS Chip Card Payment Service

CD Committee Draft

CDOL Card Risk Management Data Object List—A list of data objects used by the card to perform a transaction.

Cert. Certified—Authorized by an agreed upon Trusted Authority (whose ID is recorded in non-volatile memory in a SAM/SC).

Certificate—A cryptogram signed by an issuer or a sub-issuer of a system whose public key is known and recognized by the authenticator, thereby proving responsibility and origin of the hashed contents of the cryptogram (generally the hashed data relating to the validity of membership of a cardholder in a community, e.g. a Visa cardholder, his ID, his public key, the period of validity, his credit rating, etc.)

Cheque—Here used as an vehicle for a blind secured transaction sent over an open channel, without third party regulated clearance procedure. Cheques (CCCRs) transfer CCRs to recipients who have designated a request, see RCCCRs. See also RECeipts and requests for receipts (RRs).

CID Cryptogram Information Data—Indicating the type of cryptogram (AAC, ARQC, AAR or TC) returned by the card.

CLA Class Byte of the Command Message—First byte of a command conveying attributes of command processing CLK The signal used to drive and synchronize the workings of the CPU (or the state machine in a secured memory chip) in an ICC.

Clone—A device which behaves like another device, under all relevant conditions.

cn Compressed Numeric—Same as BCD.

Cons. Consecutive—following immediately, e.g., 369 follows 368 consecutively.

CPLC Card Production Life Cycle—The period of relevance of a card's life, from embedding of module or Issuance to end of card validity.

CR Credit Receivables-An archive of credits which are to be presented to a credit organization, in the parking meter scenario, assumed to be in lieu of cash (a cash advance).

In the parking meter scenario, credit receivables contain credits which the meter collected for a purse operator, wherein the parking meter serves as a surrogate for the purse operator, entitling the meter to reload ECASH into clients' PK smart card purses.

CRL Certificate Revocation List—listings of disqualified members of a system (black listed users or issuers)—issuers' and users' CRLs should be kept in separate files. These listings may be made current at regular intervals.

CRT Chinese Remainder Theorem—an acceleration method for modular multiplication over composite moduli (moduli which are a multiple of two or more factors)—used especially with RSA and sometimes with D-H.

CSC Consumer's Smart Card—In a system wherein physical cash ($CASH) and/or ECASH flow is protected using CCRs and/or CARs; a CSC is a smart card held by a consumer whose card can be loaded with electronic cash from an SSC (system smart card). A CSC cannot increment CCRs in an SSC. When a consumer gives an SSC holder, AMT of $CASH to an SSC holder for reloading cash to his CSC electronic cash purse, the SSC's CCR purse is decremented by AMT, as the CSC's electronic purse is incremented by AMT. When a consumer gives an SSC holder $CASH to purchase a printed travel ticket, the SSC's CCR is decremented, while the SSC executes a purchase from the TIM, e.g., the driver receives $10 from a passenger; keys in the "purchase" on the terminal, thereby decrementing his CCR by $10, to make a purchase from the terminal, which prints the $10 travel voucher; the terminal archives the purchase in a file for further reconciliation by accounting but does not increment a CCR.

When a consumer gives an SSC holder $CASH to purchase a multiple smart card travel ticket, the SSC's CCR is decremented, while the SSC executes the purchase from the TIM, whence the TIM opens a secured file in the CSC e.g., the driver receives $20 from a passenger; keys in the "purchase" of a day pass (or a multiple local 6 ticket or a special fare excursion . . . ) on the terminal, thereby decrementing his CCR by $20, to make a purchase from the terminal, which prints the $20 travel voucher; the terminal archives the purchase in a file for further reconciliation by accounting.

CSN Card's Sequence Number—A counter, managed by the card, which is increased with each transaction and authentication. See ATC.

Cum. Cumulative—a process where all values are added together.

CVM Cardholder Verification Method—A data object read from the card, indicating the procedure used to verify the card holder (PIN).

CVR Card Verification Results—A data object, managed by the terminal, indicating the result of the authentication check of card holder.

CVV Card Verification Value—

CWI Character Waiting Time Integer—See T=1 timing.

DAD Destination node Address—T=1 transport layer.

DDF Directory Definition File—A file that contains entries for other DDFs and ADFs in the current directory.

DDOL Dynamic data authentication Data Object List—Data Object list that is used to perform authentication.

DEA Data Encryption method—symmetric cryptographic method used in DES)—

DEK Data Encryption Key (shared secret between 2 DES subscribers) Deposit—The amount (or act of giving) receivables, e.g. to a treasurer or teller. Depot—In the mass transportation deployment any station or substation on line to central computer where transactions between drivers and cashiers/treasurers are executed.

DES Data Encryption Standard—de jure symmetric crypto standard.

DF Dedicated File—A file containing directory entries, or application definition data.

D-H Diffie-Hellman—public key method for secret key exchange.

DIR Directory File—A DDF that includes only EMV applications.

DIS Draft International Standard

DK Derivation Key—One of the 16 different 48 bit Secret Keys derived from a 56 bit DES Master Key. For triple DES there may be two Master Keys.

$D_N$ Data Block N

DSA(DSS) Digital Signature Method (Standard) NIST method for documentation integrity Dual Message Transaction—2 step—Authentication—then clearance Dynamic Data Authentication—Proving authenticity by answering a challenge using a secret without divulging the secret.

DTA

EasyEntry Visa spec—file for all MagStripe Info in every Visa ICC application, to provide a minimum of compliance to old applications.

ECASH Electronic value, commensurate to a national currency, kept in a consumer's ICC purse, and in some payment schemes, in a vending device.

ECB Electronic Code Book—A mode of use for DES, wherein a block (64 bits) of plain text is encrypted to 64 bits of ciphertext. Note that for the same key and the same block of plain text, the result will always be identical. See CBC.

EDC Error Detection Code—A system of adding redundant code to blocks of message, wherein it is possible to determine (but not necessarily detect) that an error of up to a predetermined size has occurred within the block.

EDT Electronic Data Transactor—Transaction terminals for depots, communicating with central data processing computer. All raw data is transmitted for processing in a central computer.

EEPROM Electronically Erasable Programmable Read Only Memory—Non volatile memory which can be written to/erased in small increments.

EF Elementary File (ISO, EMV, PC3)

EMV Work group consisting of Europay, MasterCard and Visa formed to standardize smart card payment systems, based on ISO 7816 specs, RSA, SHA1, triple DES, etc.

Entitlement to accept $CASH, ECASH. The CCRs and the CARs are the vehicles which put working limits on the entitlement of devices, agents, or employees in a payment system to accept physical cash or electronic value. Entitlement—The procedure allowing an issuer or a subissuer the proper priority to access applications—no access, read only, write only and read and write. In a payment scheme, additional entitlements may be appended; e.g., enabling the acceptance of receipts, cheques, etc.

ETICKET Electronic ticket(s) or voucher(s), equivalent to hardcopy ticket(s) and voucher(s). Typically, these tickets reside in secured purses within a PKC Smart Card, adjunct to a control file which regulates usage.

etu Elementary Time Unit—Used to define the synchronized baud rate between ICC and terminal.

FCI File Control Information—A template, returned by the card, containing relevant data options about the accessed file.

FCP File Control Parameters—A template used by the EMV to control file parameters, can be part of the FCI.

Firewall—a virtual barricade to prevent illicit access to computer systems, typically based on sound authentication methodology.

FIPS Federal Information Standard—NIST designation for US Government approved standards.

FMD File Management Data—A template used by the EMV to control file parameters, can be part of the FCI.

Floor Limit—an EMV value variable, above which a terminal has the option to transfer the negotiation process to the On-Line host Free Access Purse—A client purse for executing accelerated preferably small payments. A purse that allows a terminal free access is designed for those payments where the SC holder recognizes the terminal (a transportation ticketing device, a parking meter), where he has reasonable confidence that the terminal is operated by a responsible party, and where he can assume that he can immediately ascertain what transactions the terminal has executed, and that he will have sufficient proof in his history file, to rectify any aberrations, e.g., when a traveller inserts his SC in a TIM, the CAR purse to purse protocol will not include the TIMs proving to the SC that the TIM belongs to the bus company and is entitled to collect ECASH; however the SC does prove to the TIM that it has decremented its purse by the AMT demanded by the TIM, after having archived the transaction in the SC's history file.

Frozen Protocol—procedures which are followed assuming the inviolability of SAM/SC modules and terminal procedures.

GPO GET PROCESSING OPTIONS—An EMV command that initiates a transaction by sending processing options to the smart card. In return, if the smart card approves the processing options, it sends the AIP and the AFL.

Hacker—a real time programmer who find weaknesses in systems with intention to penetrate networks and databases.

Hash—a nonsecret one-way transformation of data, usually converting a large string to a much smaller string—usually prior to signing the smaller string—to prove authenticity of a large string—see Message and Signature. See SHA1.

hex. Hexadecimal—also 'nnn' as in '9F01' or $9F01 as in Motorola.

HHMM Hours, Minutes—A 4 byte real time data segment.

HHMMSS Hours, Minutes, Seconds—A 6 byte real time data segment. History File—A rotating file of last purse transactions performed by a SAM. In general, only the cardholder and the issuer (not the issuer's agents) have entitlement to read the file on any system terminal. This permits the cardholder to confirm the actual value of his transactions. The card issuer determines how many "last transactions" can be stored in the EEPROM.

IAC Issuer Action Code—A set of issuer defined action lists, indicating the behavior of the card, in different situations.

I-Block Information Block—in the T=1 transportation layer, the command+data set which is transmitted from the TTL to a SAM/SC.

IC Integrated Circuit—A microelectronic device on which there are a multiplicity of transistors, resistors, capacitors, etc. usually to manipulate digital data.

ICC Integrated Circuit Card—a smart card with an embedded secure CPU module, preferably with PKC protection.

IEC International Electrotechnical Commission—one of several standardization agencies defining ICC device specs, working with ISO.

IFD Interface Device—Generally an ICC reader.

IFS Information Field Size—See T=1

IFSC Information Field Size for the ICC—See T=1.

IFSD Information Field Size for the Terminal—See T=1.

IFSI Information Field Size Integer

INF Information Field

INS Instruction Byte of the Command Message—According to ISO 7816 structure, typically.

ISO International Organization for Standardization issuers of internationally accepted technical standards—see Normative References.

$ISO_{XX}(\cdot)$ ISO Format Function 9796 on $_{XX}$ bytes of text (specified in parenthesis)—a data structure for electronic signatures to protect message/document integrity.

Issuer—Card Issuer or Card Issuer's Agent

Journal Printer—An internal device which prints a record of every transaction, e.g., on a continuous tape.

$K_M$ Master Key—A shared secret key in a DES system.

$K_S$ Session Key—A (DES) Key, which is generated for, and used only once, securely exchanged for use in accelerated transmission of data between two implicitly trusting communicants.

$L_C$ Length of the Command Data Field—Number of bytes in a command.

1 cm least common multiple—the smallest factor that is common to two numbers. The 1 cm of two different prime numbers is one.

$L_D$ Length of the Plaintext Data in the Command Data Field—a one byte variable defining the length (in bytes) of plaintext data.

$L_{DD}$ Length of the ICC Dynamic Data—A one byte variable.

$L_e$ Maximum Length of Data Expected by the TAL in Response to a ISO 7816-4 Case 2 or 4 Command LEN or Length—Length of Data in Bytes (a one byte variable).

len $L_{icc}$ Exact Length of Data (denoted by a one byte variable) available in the ICC to be Returned in Response to the 7816-4 Case 2 or 4 Command Received by the ICC Lock—A closure put on an application(s) by a terminal, an issuer, or by internal negotiation within the ICC, preventing access to such applications. Some closures can be removed by the issuer, probably after card user has fulfilled obligations, or following return of card to rightful owner.

$L_r$ Length of Response Data Field—Length of Data in bytes received by the Terminal.

LRC Longitudinal Redundancy Check—A check of transmitted data integrity.

M Mandatory

MAC Message Authentication Code—A one way function, using an accepted key, usually in symmetric cryptography (with publicly known DES keys), to prove the validity of a document, and its origin. See also hashes and signatures in public key cryptography.

Message—a binary string which may include random or formatted data, and/or a Hash of said data.

MIC Message Integrity Check

MIN(I) A variable time increment in a service tariff table, e.g., in a parking meter tariff table in a very busy street, the zero'th time increment might be 15 minutes, (at a lower PM_INC(0) tariff of $0.50), and the 3rd time increment might be 60 minutes and call for a tariff, (PM_INC(3), of $10.

MIPS Million (Assembly Language) Instructions Per Second—a commonly used measure of computational performance.

n Numeric—A data string of "countable" values on which computations can be executed in integer mode only.

N/A Not Applicable

NAD Node Address—In T=1 transport level, the addresses of the source and destination.

NAK Not Acknowledged—A signal transmitted by a receiver denoting inability to correctly receive a message.

$N_{CA}$ Length of Certification Authority's Public Key Modulus in bytes.

$N_I$ Length of the Issuer's Public Key Modulus in bytes.

$N_{IC}$ Length of the ICC's Public Key Modulus in bytes.

Nibble—A group of 4 bits of binary data (one half of a byte).

No. Number—A mathematical definition of a total of finite items, which can be used directly in computations.

O Optional

One way function. Any function which is relatively easy to perform, but is computationally unfeasible to reverse, e.g., squaring a large integer over a composite modulus is very easy, but finding the square root of such a number is considered computationally intractable to an attacker who does not know the secret factors of the modulus.

Off-Line Terminal/Transactions—Instances where negotiations and risk management are handled by a remote terminal. Most PKC applications are executed Off-Line. An off-line terminal may have a dial-up option for updating and data transfer. Using public key protocols, risk management can be handled successfully off-line, wherein transactions which do not meet acceptable off-line criteria, will either be refused, or if the on-line terminal option is available, the terminal can go on-line to central clearance.

On-Line Terminal/Transactions—Transactions, preferably asymmetric, where the remote terminal serves as an intermediary to a central Host which negotiates directly with the external device. In the EMV scenarios, all ATM transactions (value transfer to a user) are On-Line. In PKC applications, fewer transactions must be executed On-Line.

OPM Operator's Personal Module. An enclosed device which contains protected transaction memory and a SAM/SC to protect transactions and gain access. Acts as a Smart Card with a large external memory.

P1 Parameter 1—In ISO 7816 standard command, the first number which appears after the command.

P2 Parameter 2—In ISO 7816 standard command, the second number which appears after the command.

P3 Parameter 3—In the EMV extension, the third number which appears after the command (used to specify length of data).

Parameter Printer—A printer which accepts commands (e.g., for following $45) for complete lines of data with additional parameters, e.g., "Time elapsed from start of journey—30 minutes, kilometers 34." —30 and 34 are parameters; e.g., the complete command would be 45, 30, 34.

Personalization—The procedure followed by an issuer wherein a smart card or SAM/SC is assigned to a subscriber with unique identification, and file structures are programmed into the EEPROM with access priorities and keys.

PAN Primary Account Number—the EMV identifier of an account.

$P_{CA}$ Certification Authority's Public Key.

PCB Protocol Control Byte

PDOL Processing Data Object List—list of data objects that a system uses to initiate a transaction.

Phase A—first deployment of TIM on 200 busses. Basic System experiments.

Phase B—System expanded with complete transition to Smart Cards.

Phase C—Total deployment with Smart Cards.

PIN Personal Identification Number—A unique number, preferably known only to the owner of a SAM/SC or smart card or an application, wherein, assuming the integrity of the keyboard used to authenticate the rightful user of said SAM/SC, and which can be used to activate the SAM/SC.

PIX Proprietary Application Identifier Extension—In a proprietary approved EMV application, an extension to the AID giving parameters necessary to regulate the application.

PKC Public Key Cryptography—One of asymmetric message systems using integrity methods with public-private key pairs, e.g., RSA, D-H, DSS, E1 Gamal, Schnorr, Fiat Shamir, etc.

PM Parking Meter. (See OPM—former alias) A device used by public authorities to regulate parking times commensurate to the AMT which a SC grants to the meter.

PM_INC(I) The price of a time increment in a service tariff table, e.g. the tariff for parking in a parking space reserved for load/unload for the zero'th 15 minute increment might be $0.10, whereas in the tenth thirty minute increment might be $40.

POS Point of Service—A terminal, capable of performing a transaction on a smart card, in exchange for a service.

Proprietary Encryption Method—Usually a symmetric encryption method wherein the user assumes added security because of the adversary's ignorance of the method. Generally considered dangerous in an open system.

PSA Payment System Application

PSE Payment System Environment—A smart card based payment system environment, including POS, terminals, etc.

PT Command to Perform Transaction followed by Terminal Certificate on Data (SCOS++)

PTICKET Printed Ticket—A paper travel voucher purchased with AMT of $CASH issued by a TIM. The driver's OPM's CCR is reduced by AMT as it purchases the voucher from the TIM (or the parametric printer's SAM/SC).

PTR Portable Ticket Reader—Inspector's tool to confirm proper procedure and one to one agreement between moneys received, tickets issued, credit for cash receivables reduced, and validity of passenger's proof of payment.

PTS Protocol Type Selection

Purse—In the SCOS++ operating system, a secured purse consists of public key protected files encapsuled within a secured silicon architecture. An SCOS++ purse can only be loaded with value by another purse, wherein the value held in the donor purse is decremented, and the value held in the recipient's purse is incremented.

A purse with proper entitlement can be loaded by a valid donor purse using one or more of the three mechanisms; as on-line purse to purse transaction; a cheque for credit for value ($CASH or ECASH) receivables possibly sent to a mailbox over an open, interceptable channel; a receipt signed by a system recognized repository (a bank). Entitlement is subject to system strategy, e.g., in a preferred strategy only an accountant can convert RRs to CCRs in his SAM; similarly only Depot Managers and Treasurers and Cashflow Managers are entitled to request and receive CCCRs.

Purse to purse transactions—Purse to purse transactions are performed generally between two $CASH purses in SAMs, linked through what may be a dumb terminal. In a $CASH purse to purse process, a very rigorous mutual authentication negotiation is executed with public key signed challenges and responses and confirmations, assuring that one purse is not charged and another not made beneficiary unless the negotiation procedure has been executed properly and in its entirety.

PV Private (Secret) Key in PKC used for Signature $S_{PV}(\cdot)$ and Decryption (RSA)

PVV PIN Verification Value—A transformation of the PIN value enabling the system operator to verify the validity of the PIN, without broadcasting a client or system secret PIN in the clear over an open channel.

RAM Random Access Memory—Memory which be specifically addressed, then written to (changed) or read from with relatively fast access time (10 to 150 ns).

R-APDU Response APDU—Response of Data and Status from the Transport to the Application layer.

R-Block Receive Ready Block—A T=1 signal.

RCCCR Request for a Cheque for Credit for Cash Receivables—the token generated by a potential receiver of a CCCR's SAM/SC to enable the SAM/SC to enable the SAM/SC to accept a single cheque from a designated source, assuring the writer of the CCCR that the cheque can and will be used to credit the receiver's CCR once, and only once.

Remote (Terminal)—A terminal device which does not normally communicate with a central host computer.

REC$_B$ A receipt from B, probably the bank who is not a fully participating actor in the system, proved by the signature on an RR and relevant data attesting to AMT of $CASH having been deposited in a receptory (a bank or a clearing organization). Only entitled recipients can convert the AMT in a REC into CCR. The mechanism is similar to "cashing" a CCCR.

RF Radio Frequency Communication. An option for allowing dispersed not otherwise communicating devices, to go on-line to a central node for reconciliation, downloading CRLs, for uploading transactions, etc.

RFU Reserved for Future Use

RID Registered Application Provider Identifier—5 bytes which uniquely identify an application provider.

R N or Random Number, unpredictable number (sequence of 1 and 0 bits), physically RND generated and computationally randomized.

RNG Random Number Generator. Preferably a Real Random Number Generator which generates a completely unpredictable number under all conditions.

ROM Read Only Memory—non-volatile immutable memory, that can be read from, but not written to.

RPA Request Purse Account—to ICC to supply an AC, which includes present status of account, type of transaction willing to perform, and an RN, generated by the ICC (SCOS++).

RR$_{XY}$ Request for Receipt. X requests an electronic receipt from Y. This assumes that X has the authority to convert a receipt into an increment to X's CCR or CAR.

This function is typically used by accountants who reconcile receipts with accounting statistics and transfer CCRs to a company treasurer whose duty is to send CCCRs to dispersed $CASH collectors.

This signed request for receipt typically includes proof of X's belonging to the system, and data issued by X's SAM/SC which will enable to convert said receipt once, and only once into CCR or CAR (CxR).

RSA Rivest-Shamir-Adelman Method—most flexible and de facto standard PKC—for electronic en/decryption, key exchange and document signature.

RS485 See Standard Serial Communication.

RST Reset—A software or hardware triggered initialization, which erases sensitive data and forces the system into a safe starting procedure.

RTC Real Time Clock—A vital component in a secured system to attest to the time that a transaction is performed.

R-TPDU Response TPDU—Response received by the terminal transport layer from an ICC.

SAD Source Node Address—In T=1, that part of the NAD which indicates the source of a block of data.

SAM Secure Access Module—A Motorola SC49 or CF54, for example, can be embedded in a smart card, or the security module in a larger computing device.

S-Block Supervisory Block—In T=1, used to send control blocks.

SC, SC$_x$. Smart Card or SAM. Subscript x signifies SC or SAM belonging to x.

SC1, SC2 In a specific scheme, SC1 generally defines the granter of value, SC2 the acceptor of value.

S$_{CA}$ Certification Authority Private Key.

Script—in EMV nomenclature, a sequence of commands coupled with data to be conveyed by the terminal to the ICC without interpretation.

Secured ICC architecture—a monolithic silicon cryptocomputer, essentially characterized to disallow illicitly invasion, with a virtually inviolate internal bus, no test points, hardware to disable running at low speeds (less than 0.5 mhz), insuring a block erase of EEPROM when top metal layer is scratched, etc.

SFI Short File Identifier—A unique 5 bit number used to access an EF within the same application or directory.

S$_1$ Issuer's Private Key—The Secret (only RSA in present EMV specs) key used by the issuer to sign certificates of participants in the Issuer's applications.

S$_{1C}$ ICC's Private Key—The Secret key (RSA in EMV) embedded in the EEPROM.

In the "off the shelf" SCOS+, ICCs, this key is generated by the card, within the card, and is in a secured section of the EEPROM, accessed only by the proprietary library.

Signature—Computational transformation on a message using a signer's private key, proving document integrity and liability of signer to unalterable contents. EMV authorize the RSA method for signatures. Usually part of a signature is composed of a hash on large quantities of data, to enable a single signature to prove integrity of more than one block of data. See SHA1, DSA, and RSA.

SHA1 NIST's Secured Hash Method—a very strong one way function to transform a long data string into a 160 binary bit sequence for signing with the DSA or other signature methods. (Second rendition, first was designated SHA). Standard Serial Communication—RS485—A multidrop noise resistant network standard, often used for in situ automotive peripheral communication. Static Data Authentication—Off-line asymmetric PKC authentication of certificates as opposed to dynamic data authentication, wherein both prove their identities and can prove integrity of messages.

SSC System Smart Card—In a system wherein $CASH flow is protected using CCRs, a SSC is a card or SAM held by employees of the system which are entitled to accept cash in return for CCRs. When an SSC accepts $CASH or writes a cheque for credit for cash receivables; its CCR is decremented by AMT if it received $CASH; its CCR is incremented by AMT if it bestows $CASH. When an SSC loads a Consumer's Smart Card with electronic cash, the SSC's CCR is decremented and the CSC's electronic purse is incremented with electronic cash. Electronic cash ordinarily, cannot be transformed, off-line, back into CCR. See CSC.

SW1,SW2 Status Words—Returned by the card, to indicate command termination status. String—A sequence of ones and zeros. Sweethearting—A state of collusion where a service or goods provider conspires to defraud his employer while charging a lower than proper AMT.

S$_{XX}$(·) xx's PKC signature on the value in parenthesis. If the data in the parenthesis is longer than the modulus of the signer's (certifier of validity) modulus, then it is assumed that either the data is signed in parts, or, preferably, the data is transmitted separately, then hashed, and the signature is then performed on the hashed value, and/or on the hashed value and a part of the data that is transmitted along with S$_{xx}$.

T Transaction Type—designation of credit/debit, secured/free access balance, cashback, or lock application.

T=0 The original ISO byte oriented single user protocol for data transmission between a contact smart card and a terminal.

T=1 The advanced ISO packet oriented multi-user protocol for data transmission between several smart cards and a terminal. Tachometer/graph—a device measures and charts the speed of a vehicle as a function of time.

TAL Terminal Application Layer—an application program running on the terminal using the TTL to communicate with the ICC.

TC Transaction Certificate—a "Signed Cheque".

TCK Check Character $TCLK_X$ A time measuring device used to measure the incrementing period of X's parking. (measured from time X inserts SC in PM).

TDOL Transaction Certification Data Object List Tear Protection—A backup firmware methodology to prevent or compensate for illicit or unintentional interruption of a transaction procedure.

TIM Ticket Issuing Machine—A cryptocomputer regulated device that controls money collection, ticket issuing and collection, controls access to vehicle, and collects transaction and automotive data relevant to a payment collection operation.

Time Stamp—That part of a certificate which testifies to the time of signature on a string of data.

TLV Tag-Length-Value—Data object structure definition, preferably according to ISO Basic Encoding Rules.

TPDU Transport Protocol Data Unit—The data unit sent by the ICC to the terminal to regulate communication.

TPMP Temporary Purse in Parking Meter—A purse which receives the client's parking deposit and dispenses increments to the account's receivable while client's car is parked; holding the client's unspent ECASH; If the "unspent" surplus is returned to the client's smart card when the client retrieves his vehicle; the unspent portion or part therof increments (is returned to) the client's ECASH purse, any other remainder increments the accounts receivable and decrements the entitlement contained in the CAR.

Trace—A service giver/terminal's ID string (8 bytes).

Trans. Transaction—A negotiated transmission of data.

TSI Transaction Status Information—A present assessment of negotiated information.

Transaction Velocity Check—An method that decides to perform the transaction on-line or continue off-line, dependent on several risk assessment variables.

TTL Terminal Transport Layer—manages the command/response pair transmission sequence between an ICC and a Terminal. Receives an APDU from the TAL and sends a TPDU to the IC.

TVR Terminal Verification Results—A bit mask, managed by the terminals containing the status of the card verification process.

UDK Unique DEA Key—A secret random key, unique to a DES process.

Validator—In the mass transportation scenario, a Smart Card accepting device to collect value from a multi-ride ticket purse, and for allowing cardholders to read last transactions.

var. Variable—A data string whose value can be changed by authorized members of a defined cryptographic community.

Verification—Generally the check performed by a cryptocomputer, to ascertain the values contained in a signed transaction certificate.

V.I.P. VisaNet Integrated Payment

Warden—An inspector whose duty is to inspect violations and failures in a service system (parking meters), and in those systems which cannot communicate on-line to a central database, to download data and CRLs, and transfer transaction data for central clearance.

YDDD Year, Day ('Y'=Rightmost digit of the year (0–9). 'D'=Day of the year (1–366))—A two byte hexadecimal representation of date.

YYMMDD Year, Month, Day—A three byte hexadecimal representation of a date.

The present invention seeks to provide improved apparatus and methods for computerized control of payment collection.

There is thus provided, in accordance with a preferred embodiment of the present invention, a system for safe collection of payment in return for goods, values or services, the system including a multiplicity of electronic system elements wherein each individual one of the elements has a purse storing an amount of credit for value receivable granted to the individual system element, each purse including a purse monitor operative to sign and authenticate a transaction record of each transaction in which the purse uses some of the credit for value receivable which it has been granted, and a purse control unit operative to prevent the purse, off-line, from exceeding the credit for value receivable which it has been granted.

There is also provided, in accordance with a preferred embodiment of the present invention, a system for safe collection of payment by a vehicle operator from riders, the system including a multiplicity of electronic payment receipt generators, each operable by a vehicle operator, wherein each individual one of the payment receipt generators includes an electronic purse storing an amount of electronic cash, each electronic purse including an electronic cash loader operative to use some of the electronic cash to generate a payment receipt to be given by the vehicle operator to a rider, and an electronic purse control unit operative to prevent said electronic cash loader from exceeding said amount of electronic cash, thereby limiting the vehicle operator's entitlement to collect payments from riders, and an electronic cashier purse operative to increment the electronic purse of each electronic payment receipt generator by the amount of payment collected by the vehicle operator to whom the electronic payment receipt generator is assigned.

Further in accordance with a preferred embodiment of the present invention, each of the purses includes a SAM (security application module).

Still further in accordance with a preferred embodiment of the present invention, each purse control unit is public-key protected.

Further in accordance with a preferred embodiment of the present invention, the multiplicity of payment receipt generators communicate with the electronic cashier purse in an encrypted manner.

Still further in accordance with a preferred embodiment of the present invention, the multiplicity of payment receipt generators communicate with the electronic cashier purse by employing public key cryptographic signatures.

Additionally in accordance with a preferred embodiment of the present invention, the total amount of all vehicle operators' entitlements to collect payments from riders is limited to a preset amount. Also provided, in accordance with another preferred embodiment of the present invention, is a method for safe collection of payment by a vehicle operator from riders, the method including providing a multiplicity of electronic payment receipt generators, each operable by a vehicle operator, wherein each individual one of the payment receipt generators includes an electronic purse storing an amount of electronic cash, using some of the electronic cash to generate a payment receipt given by the vehicle operator to a rider, preventing the total amount of payment receipts from exceeding said amount of electronic cash, thereby limiting the vehicle operator's entitlement to collect payments from riders; and incrementing the electronic purse of each electronic payment receipt generator by the amount of payment collected by the vehicle operator to whom the electronic payment receipt generator is assigned.

Further in accordance with a preferred embodiment of the present invention, the multiplicity of payment receipt generators communicate in an encrypted manner.

Still further in accordance with a preferred embodiment of the present invention, the multiplicity of payment receipt generators communicate by employing public key cryptographic signatures.

Further in accordance with a preferred embodiment of the present invention, the total amount of all vehicle operators' entitlements to collect payments from riders is limited to a preset amount.

A preferred embodiment of the present invention is now described:

In large and small scale distributed payment schemes, off-line agents (bus drivers, fuel station attendants, merchants, parking meters, vending machines, etc.) are called upon to accept cash or equivalent cash advances from credit granting entities and transfer value to (reload) smart cards. An off-line terminal is one that handles all or some transactions without communicating with a central database. These applications, before the introduction of Fortress or similar monolithic silicon cryptocomputers, would not have been practical being subject to large scale interference from fraudulent adversaries.

Operators, who in the past were able to work in a cash-only environment, or others, who may not remember the universality of "folding or physical money" as it once existed, would benefit from an electronic purse cash scheme that would be convenient both for consumers and suppliers, with such savings as they once existed. Now, with the advent of electronic money, it is desirable to enhance the option of converting customers' physical money into electronic cash, simplifying and securing clearance through credit card companies, allowing consumers to be benefited with cash discounts, while spreading an equitable part of the savings to participating vendors and providers of service.

In a typical system, customers benefit from having cash held safely in a protected purse. Participating purse loaders may receive a bonus for handling cash (bills and coins= $CASH) or in any other way reloading electronic purses with electronic cash (ECASH or stored value of any form). The operator benefits from interest on the outstanding float held in the consumers' smart cards.

An important issue is how the system operator can be assured, that, in such a dispersed system, where the purse loader and the various cashiers may have only the loosest common interest with the purse operator, that all cash and value will be deposited by the purse operator's agents to the operator's account. Without proper protection agents who load value into cards may be tempted to engage in 'printing money').

This issue is now resolved as there are compact mass produced, securely protected monolithic data protection mechanisms (public key cryptographic) which immutably compel participants (i.e. silicon microchips) to follow system rules (i.e. protocol frozen in the microchips).

The electronic purse, for relatively large transactions, used in true off line applications, is a relatively new technology, due to the only recent advent of Public Key Smart Cards. With these new smart cards, a valid user can prove to any accepting terminal in the system, that the smart card is owned by a valid user, and that at a given time, the card has a credit balance sufficient to cover a proposed transaction.

In a smart card chip such as those manufactured by the applicant/assignee, Fortress U & T Ltd., there may be several purses. The same chip can be uniquely initialized and personalized by several independent issuers, and each issuer may embed a unique variety of purses and information protecting applications in an individual user's card.

To protect honest users, vendors and issuers from fraud, rules are made and followed to assure the validity of a transaction, and protect honest vendors and consumers.

With credit purchases, general rules of what the EMV calls risk assessment typically include data to prove that an off-line transaction is protected by the cryptographically authenticated knowledge that the purse in the smart card and the accepting terminal are in a valid status; meaning that they are both in good standing, and that the smart card has not used more credit than is allowed, has paid his bills as recently as was demanded, and of course a check for any other aberrations that an issuer might desire, such as a limit on the number of withdrawals in a period of time; the number of purchases that can be made without the vendor's terminal "going on-line" to the central computer in order to restore the line of credit in the card. In the Fortress purse each off-line purchase instantaneously reduces the amount of credit available to the user, which can be reinstated in an on-line transaction or in a purse to purse session with an approved agent.

A vendor or service terminal can receive payment for goods and services from either a debit (stored cash value) purse or a credit purse. This electronic money is transferred, probably at the end of the day, to a clearance organization which properly credits his account. The EMV is drafting new rules which will allow the terminal to insist, for instance, that certain payments, usually small payments less than a predetermined threshold, be made only from a stored cash value purse, and larger transactions are made using a regulated debit or credit purse.

It is anticipated that the terminal will either maintain separate purses for each clearance organization, as in all probability, the strategies for each might differ, or it may collect all electronic payments, archive them, hash and sign the hash to testify to origin, and send to a single clearance organization. Purses in smart cards with safely stored electronic cash or electronic credit will make electronically signed purchases, which will benefit from clearance procedures similar to today's checks and credit card purchases, with a larger degree of confidence than was previously enjoyed.

There are rules for a client depositing $CASH with an agent who then reloads an equivalent value of ECASH in the client's smart card (replenishing spent value) at an off-line site. This has inherent potential danger as an 'unruly' terminal reloading electronic cash literally can print money. In this venue, the consumer has assuredly proved his credit by furnishing the purse reloader with cash. The system operator now must be sure that the value reloaded into the consumer's card is commensurate with the monies the operator is to receive in his bank account from the purse reloader, so that he can compensate vendors for goods and services to be received from card-holders who pay with electronic cash.

Purse to Purse Transactions: In purse to purse transactions, value is removed from one purse and loaded into a second purse. In all such transactions, the value should be commensurate and cryptographically protected. Owners of both purses have controlled access to a 'rotating' file of last transactions (a history file), enabling them to validate, in any compliant terminal, who, and what monies have been removed or added into their purses. This can protect them from rogue vendors who may have purposefully overcharged or fraudulent terminals which may have 'short changed' the card when loading ECASH.

Direct Purse to Purse transactions: Most purse transfers of small value, the largest number of transactions in this scheme, are consummated between dispersed off-line SSCs (terminals and field operators' security application modules/smart cards) and consumer/client CSCs. Preferably, the parties identify each other on the spot and terminate a one or two sided authenticated transaction in a maximum of about half second to two second period of customer transaction time.

As the hierarchy in a deployment scheme such as FIG. 1 is ascended, each level of transactions involves larger value physical cash purse to purse transactions, e.g., drivers to cashiers or treasurers, or cashiers to treasurers, in-system employees to validating participants where at each stage the sums of CCRs grow. Collusion between high and low hierarchy participants is most likely. Keeping control of cash with proper archiving, transmission of all raw data to the central computer for filtering, and purse to purse transactions using PKC offer good protection.

The concept of "credit for cash receivable" (CCRs)— CCR is a regulating entitlement mechanism that the system operator may employ to administer the limits of the amount of cash in the float, and to assure that operators of purse—reloading terminals, or any intermediaries who receive cash destined to the system operator are limited in the amount of cash they receive before depositing such physical cash with the entitled SSC holder or bank, and to compel them to remit all of the receipts provide for in an orderly and secured continuation of the cash collection system. When a system smart card's CCR is exhausted, the owner cannot use his purse to dun a consumer or another system card for cash.

In a system smart card—consumer smart card, purse to purse (physical cash via SSC to consumer's electronic cash) transaction, the SSC CCR purse is decremented by the same amount that the consumer's electronic purse is incremented, e.g. a bus driver who accepts AMT cash from a passenger, to be deposited in the passenger's cash purse; the driver's CCR will now contain AMT less, and the passenger will have AMT more in his ECASH purse to be spent on travel or in the bus station, or cashiers to treasurers, in-system participants to validating participants where at each stage the sums of CCRs grow.

In a cash transaction between two system smart cards, the CCR in A is decremented as he receives cash from B, whilst the same value from A's CCR increments B's CCR; e.g., a driver brings his $600 in cash receipts to a station's treasurer; the treasurer's CCR is decreased by $600, and the driver's CCR is reloaded with $600, probably following a company rule that at every deposit that the driver makes with a treasurer, the driver must replenish his CCR to the maximum float that the system operator granted him.

The Maximum Total Float and each individual SSC Float. In this system the decision for, and allocation of the CCRs in the float is directed by the committee or board of directors, and the implementation of allocating the amount installed in a system by these directors is authorized by the manager of the cashflow, monitored and reconciled in all phases by the Central Accountant. Subsequent day to day operation can be automatic.

The single entry point for CCRs is via the managing directors to the central accountant. The accountant arranges the individual allotments according to the director's strategy, and submits, with a single CCR of the total sum to be allotted, accompanied by a list of unsigned CCCRs (cheques for credit for cash receivables) to the manager of cashflow—who electronically allots CCRs, e.g. by simply approving a spread sheet sent to him by the accountant, with a program which commands his smart card to sign the cheques and then to dispatch these cheques for credit for cash receivables; much as he would sign and send present day cheques.

In a transportation system, the only occasions when the directors add CCRs to the float are typically either a system expansion or during a period of inflation.

During system and card initialization, a secured file is generated, which can be read by any terminal, but can only be addressed by the manager of cashflow. This file contains the limit of CCRs which can be loaded into a card, and an optional date of expiration. In general, this file can only be changed by the manager of cashflow, and this only under the aegis of central accounting. An option is allowed for the station manager to grant, to a qualified SSC, a larger amount of maximum float, for a minimal period of time.

Replenishing Purses with 'Blind Cheques' CCCRs—checks for Credits for Cash Receivables In the cash transactions described above, two purses, the cash depositor and the cash receiver were simultaneously inserted in a dumb terminal, which monitored the purse to purse negotiations and transaction. Negotiations and transfers were secured internally in the two purse's smart card. When the money is deposited in the bank, the treasurer may or may not be present at the teller's counter, and as the system operator will probably not agree that the treasurer's CCR purse is replenished daily to the same maximum amount, because of normal daily and seasonal fluctuations. The anticipated receipts vary greatly, and there may be a change of treasurers or treasurer's working venue. A preferred solution to this problem is that the treasurer will receive a blind cheque, that goes through a normal clearance mechanism, wherein the treasurer alone is able to use the cheque to increment his CCR, and he and only he can use the cheque once and only once. An analogy might be—a rogue treasurer receiving a conventional bank check payable to him alone which he wished to use to credit his account several times (in the absence of a clearance mechanism that might detect such a scam); as the check was made from an easily detectable unobtainable paper, and the printing on the checks was impossible to duplicate, no matter what methods he would use, he would be unable to make acceptable copies of the cheque to enable him to credit his account several more times.

A similar situation arises in the United States where the Department of Agriculture issues food credits to the needy. A blind cheque must be issued to each of the indigents, who can only use a cheque once, and the USDA must know who the recipient of the cheque is, and that his purse will only be credited with the given amount a single time, when presented to a potentially fraudulent terminal.

In the present embodiment of the present invention, all payments to station managers, station treasurers, and cash flow managers are made with cheques (CCCRs).

The method used here for assuring that a cheque can be credited, once, and only once, is for the issuer of the cheque to know a unique number, which was provably generated by the receiver's smart card (SAM) to be used once and only once, which, as the receiver's protocol is frozen, entitles the receiver to receive a cheque with his primary account number and the unique number only once. This number can be the result of a simple count. In this system, the writer of the cheque knows these numbers, as his smart card (SAM), received the number in an electronically signed request for the cheque for credit for cash receivables (RCCCR), signed duly by the potential recipient of the cheque.

The Bank's Receipts—A similar situation arises when the treasurer (or a lottery kiosk collector or a fuel station treasurer) deposits value in the bank. The bank is typically not an active participant in the payment system, but may be willing that the teller be willing to confirm with an electronic receipt (the equivalent of signing a deposit slip), which the teller can sign. This is making no more demand of the teller for actions, other than those he normally executes.

The central accountant's SAM, and his alone, is programmed to be able to convert a RECeipt from the bank into CCRs. The central accountant's SAM CCR account is totaled once a day, and converted into a single cheque for the manager of cashflow.

The manager of cashflow sets the strategy for distributing CCCRs to the depot treasurers, and the central accountant reconciles this policy, and prepares unsigned electronic cheques for the manager of cashflow to approve and sign. These cheques are automatically distributed by modem to the depots' electronic mailboxes for the treasurers to collect and reinstate their CCRs, entitling them to continue collecting $CASH from drivers and cashiers, to be deposited in the bank, to credit the transportation system's account.

Preferably, parking meters and vending machines, in sensitive to vandalism locations which cannot accept $CASH will be programmed to allow a user to draw a small amount (such as $25) from his credit purse (account) in order to restore his stored value purse and use the meter/machine. In such a case, the meter/machine would be limited with "credit for cash receivables", determined by the system operators.

Restraint and constraint strategies to be placed on vendor's use of "cash received" in lieu of "credit for cash receivables".

Time Restraint

A vendor's terminal can be programmed so that it must deposit cash received within a certain time bound. In a public transportation scenario, 48 hours is a suitable limit, without levying a fine.

This, obviously, would be unsatisfactory in a situation where very small amounts are involved, as participating merchants, in such a situation would be daunted by the difficulties of handling transactions.

Limiting the Credit for Cash Receivable that a Vendor is Allowed:

In all Fortress vendor and consumer SAMs and smart cards, a value of use limit is put on all purses. The system operator is probably not willing that the vendor collects and holds large amounts of money for long lengths of time which he used to reload customer purses; certainly not without receiving interest for non-payment on time.

This is the "hold" that the system operator has on the vendor. If a vendor does not comply with the operator's rules, and has used up his credit for cash receivables, then the vendor may refuse to reissue his credit, and the vendor will then be unable to reload stored value into consumers' purses.

Coupling the Motivating Bonus which the Vendor receives for handling the cash with interest charged to the vendor for delayed transfer of funds, in those cases where the vendor does not 'buy' the original CCR sum, but is allotted by the system operator.

All cash which is collected by vendors is archived in the vendors' terminals, dated and certified. All funds collected by a vendor grant him a percentage bonus for handling and transferring the money for clearance, and for his part in collecting payments in advance.

What would be a typical strategy, would consist of a bonus percentage, and an "average per day delayed transfer percentage".

To demonstrate, let us assume a 3% bonus, a three day grace period, and a $1/10\%$ per day "average per day delayed transfer percentage", and that a convenience store accepted cash, as appeared in the table from the 10th of the month (the last time cash was transferred) until the 18th of the month, when the convenience store made a bank transfer to the system operator.

| Day | Daily $ Receipts | Totaled Receipts $ | 1/1000 of 3rd day (Interest) | Interest to Date | Bonus $ | Bonus $ less Interest |
|---|---|---|---|---|---|---|
| 10/11 | 1000 | 1000 | | | | |
| 11/11 | 1500 | 2500 | | | | |
| 12/11 | 3000 | 5500 | | | | |
| 13/11 | 1000 | 6500 | 1.0 | | | |
| 14/11 | 500 | 7000 | 2.5 | 3.5 | | |
| 15/11 | 1500 | 8500 | 5.5 | 9.0 | | |
| 16/11 | 6000 | 14500 | 6.5 | 15.5 | | |
| 17/11 | 2000 | 16500 | 7.5 | 23.0 | | |
| 18/11 | 500 | 17000 | 8.5 | 31.0 | 510.00 | 478.50 |

Availability of the System:

The above-described cashflow system may be generated as follows: The hardware is supplied off the shelf by Fortress U&T Ltd.

Each work station in a preferred embodiment is an IBM type PC equipped with Windows 3.1 or 95, 16 Mbyte of RAM, a hard disk and a BestCrypt-4-PC drop in card, at least one smart card reader.

An issuer's workstation is maintained in a very well protected area, used for initializing smart cards and workstation SAMS, and it is used to configure the workstations, each with proper access and priority.

The Smart Cards and SAMS used in the system are the first generation SGS-Thomson ST-CF54 with the first version SCOS+ operating system.

BRIEF DESCRIPTION OF THE DRAWINGS

The present invention will be understood and appreciated from the following detailed description, taken in conjunction with the drawings in which:

FIG. 8B is a sample table storing predetermined sequences of parking time-intervals;

FIG. 15 is a pictorial illustration of a display screen generated by a transaction terminal; and FIG. 16 is a pictorial illustration of a display screen generated by a smart card application developer.

Attached herewith is the following appendix which aids in the understanding and appreciation of one preferred embodiment of the invention shown and described herein:

Appendix A is a computer listing of a preferred software implementation of the present invention operative in conjunction with a plurality of SGS-Thomson STCF54 chips equipped with a SCOS+ or SCOS++ operating system, commercially available from Personal Cipher Card Corporation, Lakeland, Fla., USA or Fortress U & T Ltd., Beer-Sheva, Israel, the chips being customized using an SCAD development system, commercially available from Fortress U & T Ltd.

DETAILED DESCRIPTION OF PREFERRED EMBODIMENTS

Figure 1:
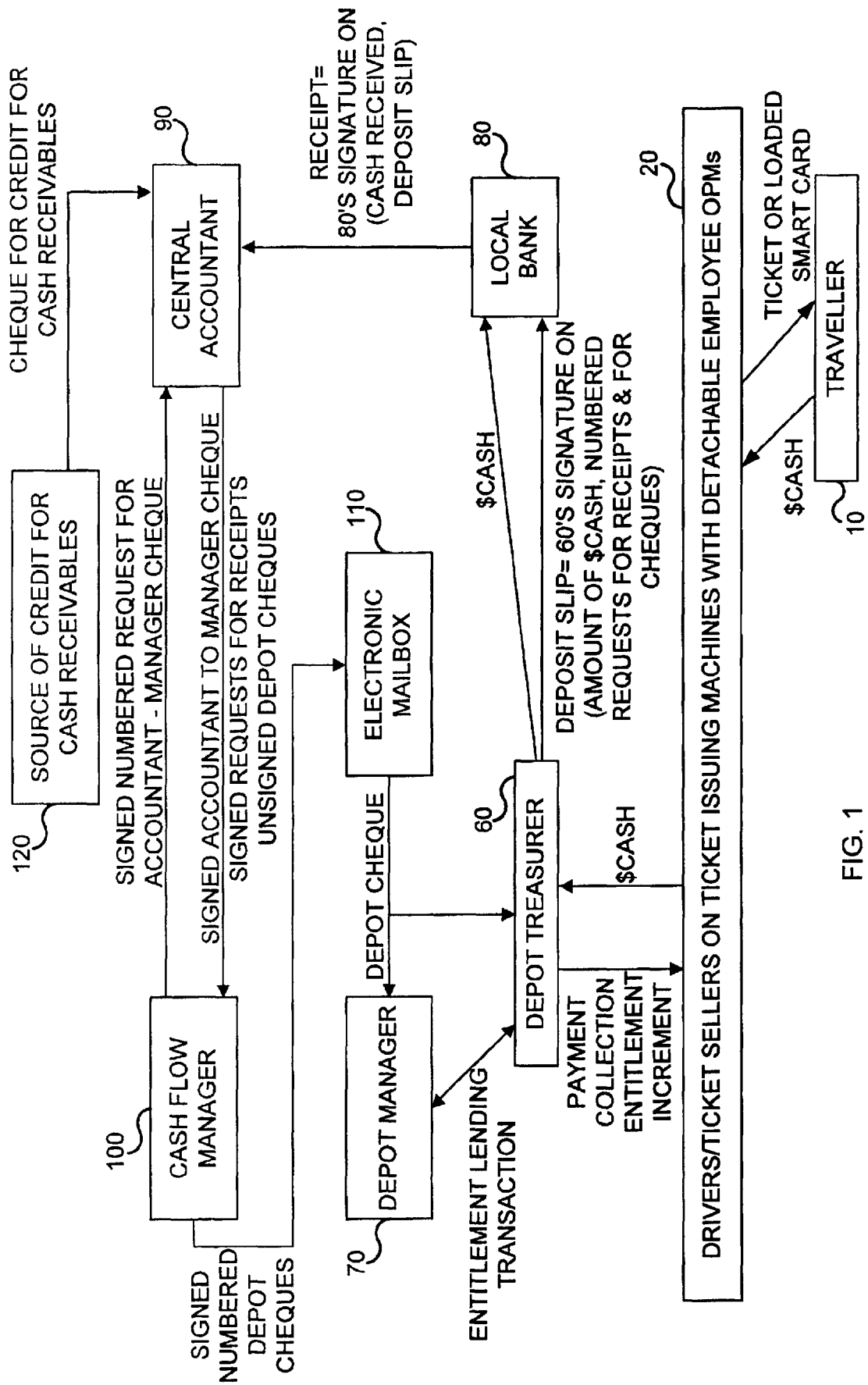
FIG. 1 is a simplified block diagram of a payment collection system useful for a transportation network, the system being constructed and operative in accordance with a preferred embodiment of the present invention.

Reference is now made to FIG. 1 which is a simplified block diagram of a payment collection system useful for a transportation network, the system being constructed and operative in accordance with a preferred embodiment of the present invention.

The system of FIG. 1 includes a population of travelers 10 and a population of transportation service providers 20. Each transportation service provider is equipped with an "OPM" or operator's personal module. The OPM includes an electronic purse which stores the transportation service provider's current entitlement to collect physical cash payment from travelers. The electronic purse is preferably public key signature protected.

Each transportation service provider, also termed herein a "driver", is operative to perform transactions, each of which includes:

a. receiving physical money from a traveler;

b. in return, providing an electronic or paper ticket to the traveler or loading the traveler's smart card, all in proportion to the amount of physical money received; and c. Debiting his own electronic purse to reflect the value of the ticket issued or the amount of value loaded into the traveler's smart card.

A preferred feature of the driver's OPM is that (c) is performed automatically once (b) is initiated by the driver.

The population 10 of travelers includes one, some or all of the following types of travelers:

a. a first type oft ravelers who interact with the transportation service providers 20 by transferring physical money, also termed herein "$cash", to the service providers 20 and receiving a paper ticket therefrom in return.

b. a second type of travelers who interact with the transportation service providers 20 by transferring physical money to the service providers 20 and, in return, having their smart cards loaded with electronic cash by the transportation service providers;

c. a third type of travelers who interact with the transportation service providers 20 by transferring physical money to the service providers 20 and receiving electronic tickets therefrom in return.

The system of FIG. 1 also includes a population of depot treasurers 60 each equipped with an "OPM" or operator's personal module. The OPM includes an electronic purse which stores the depot treasurer's current entitlement to collect physical cash payment from drivers. The electronic purse is preferably public key signature protected.

Each depot treasurer is operative to perform transactions, each of which includes:

a. receiving physical money from a driver;

b. in return, incrementing the driver's electronic purse, in proportion to the amount of physical money received from the driver; and c. Debiting his own electronic purse to reflect the increment to the driver's electronic purse.

A particular feature of the depot treasurer's OPM is that (c) is performed automatically once (b) is initiated by the depot treasurer.

Optionally, some or all of the drivers do not interact directly with depot treasurers but rather via an intermediate entity known as a "branch cashier".

The system of FIG. 1 also preferably includes a population of depot managers 70 which serve as a buffer, each of which is equipped with a smart card or an OPM. The manager's OPM or smart card includes an electronic purse which stores the depot manager's current entitlement to lend physical cash payment collection entitlement to treasurers. The electronic purse is preferably public key signature protected.

Each depot manager is operative to perform transactions, each of which includes:

a. incrementing a depot treasurer's electronic purse; and b. debiting his own electronic purse to reflect the increment to the treasurer's electronic purse.

A particular feature of the depot manager's OPM or smart card is that (b) is performed automatically once (a) is initiated by the depot treasurer.

If the system includes depot managers, the OPM of each depot treasurer associated with a depot manager is also operative to perform the above type of transaction, so that a depot treasurer is able to return to his depot manager payment collection entitlement which the manager previously lent to the treasurer.

The system of FIG. 1 also includes a population of local banks 80 each equipped with a smart card and an associated computer. The smart card is preferably public key signature protected.

Each local bank is operative to perform transactions, each of which includes:

a. receiving physical money from a depot treasurer;

b. electronically signing an electronic document provided and signed by the depot treasurer. The electronic document indicates the sum total of physical cash payment collection entitlements which the depot treasurer dispensed to drivers since he last interacted with the local bank. Except for human error or system malfunction, this sum total is the exact amount of physical money transferred in step (a).

The electronic document also includes a request for a receipt (RR) and a request for a cheque for credit for cash receivables (RCCCR). A preferred embodiment of these requests and their operation is described in detail above.

The local bank's signature includes an indication of the amount of physical money received. It is in the interest of the depot treasurer and the local bank personnel to communicate in the event that the indication of the amount of physical money received differs from the sum total included in the electronic document, e.g. due to human error on the part of the local bank personnel.

The electronic document provided by the depot treasurer 60 and signed by the local bank 80 is transmitted to a central accountant 90 equipped with a security module. The electronic document includes a token which enables only the security module of the central accountant 90 to convert, exactly once, the amount specified in the electronic document, into credit for cash receivables of the same amount. The term "credit for cash receivables" refers to entitlement to collect a certain amount of physical cash payment.

Periodically such as daily, or upon demand, the central accountant 90 prepares and signs an electronic cheque for credit for cash receivables for the amount specified in the electronic document. This cheque, termed herein the "accountant-to-manager cheque", is transmitted to a cash flow manager 100 equipped with a security module. The central accountant 90 also prepares, for each of the depots, an electronic cheque. The electronic cheques for the depots, also termed herein "depot cheques" or CCCRs (cheques for credit for cash receivables) are transmitted to and signed by the cash flow manager 100. Each depot cheque typically includes the following:

a. A numbered request, signed by accountant 90, for a receipt;

b. A numbered request, signed by depot entity 60 or 70, for a cheque;

c. The amount of the cheque.

In FIG. 1, a "cheque", drawn to a certain amount, means an entitlement granted to the beneficiary of the cheque to collect exactly that amount of physical cash payment. This entitlement, also termed herein "credit for cash receivables", is transferable exactly once from the donor of the cheque to the recipient thereof.

After having received the unsigned depot cheques, the cash flow manager signs these cheques electronically, and transmits them to the appropriate depots. Typically, the cheques are sent via an electronic mailbox 110 to either the depot manager or the depot treasurer.

Each of the entities in FIG. 1 has a security application module (SAM). Some of these SAMs are operative to receive cheques, typically the SAMs of each of the following entities: Depot manager 70, depot treasurer 60, cash flow manager 100.

Each SAM is operative to prevent the entity with which it is associated from converting a cheque to credit for cash receivables, more than once. This is done by generating a sequence of non-repeating cheque identification numbers, e.g. by means of a counter, and storing these numbers in its public key secured non-volatile memory. The non-repeating cheque identification numbers prevent repeated use of a single cheque, thereby ensuring entitlement, exactly once, to the exact amount on the cheque, as described in detail below with reference to FIGS. 4–5.

A preferred feature of the present invention is that although the electronic cheques are typically transmitted over open channels and therefore can be copied freely, nonetheless the electronic cheques can only be used (i.e. converted to credit for cash receivables) once and only by their intended beneficiary. This feature is preferably implemented by "freezing" a protocol which ensures only a single use of cheques by only their intended beneficiary such as one of the protocols shown and described herein. The protocol is typically "frozen" within a secured externally immutable non-volatile memory of a SAM which includes a monolithic (i.e. single-chip) public key protected cryptocomputer. The protocol typically includes the following rules:

a. A cheque cannot be received unless it has been requested. Each request includes an index or other unique number, generated by the monolithic public key protected cryptocomputer so as to be different from the identification numbers of all previous requests. The mechanism in the cryptocomputer which generates these indices or other unique numbers is also termed herein an ATC (application transaction counter).

b. A cheque includes the index of the request for that cheque. The cheque reaches its intended recipient signed, and therefore, the intended recipient cannot tamper with the index.

c. When a cheque has been used, the cryptocomputer notes this, e.g. by storing a "used" indication in association with the index of that cheque or by deleting the cheque's index from memory.

d. A cheque which has been received cannot be used if a "used" indication is stored in association with its index.

Similarly, although the electronic receipts are typically transmitted over open channels and therefore can be copied freely, nonetheless the electronic receipts can be used by the central accountant 90 (i.e. converted to credit for cash receivables) only once. This feature is preferably implemented by "freezing" a protocol which ensures only a single use of receipts. The protocol is typically "frozen" within the central accountant's SAM which includes a monolithic (i.e. single-chip) public key protected cryptocomputer. The protocol typically includes the following rules:

a. A receipt cannot be received unless it has been requested. Each request includes an index or other unique number, generated by the monolithic public key protected cryptocomputer so as to be different from the identification numbers of all previous requests. The mechanism in the cryptocomputer which generates these indices or other unique numbers is also termed herein an ATC (application transaction counter).

b. A receipt includes the index of the request for that receipt. The receipt reaches its intended recipient signed, and therefore, the intended recipient cannot tamper with the index.

c. When a receipt has been used, the cryptocomputer stores a "used" indication in association with the index of that receipt.

d. A receipt which has been received cannot be used if a "used" indication is stored in association with its index.

In FIG. 1, credit for cash receivables, i.e. entitlement to receive physical cash, is transferred, in normal steady state operation in a cycle, from the central accountant 90, to the cash flow manager 100, to the depot treasurer 60 and/or manager 70, to the drivers 20. The drivers' entitlement to receive physical cash is reduced to the extent that they receive actual physical cash but is restored by the depot treasurer in return for transferring the physical cash to the depot treasurer 60. The depot treasurer's now depleted entitlement is eventually restored by the cash flow manager 100, once the depot treasurer 60 has deposited the physical cash he received from the drivers in the bank 80 and once that physical cash has merited the central accountant with a receipt which in turn merits the cash flow manager to receive renewed entitlement to receive physical cash.

Entitlement to receive physical cash, also termed herein credit for cash receivables, is typically injected into the system of FIG. 1 initially and upon occasion, by an external source 120. Preferably, the interface between the external source 120 and the central accountant 90 is secured by a portion of the protocol of the central accountant's SAM which only accepts cheques which are multi-signed. In addition, the uniqueness of the interface is preferably maintained by a portion of the protocols of all SAMs other than the central accountant's which portion rejects input from the external source.

Typically, each bus is equipped with a ticket issuing machine (TIM) and each operator (driver) is equipped with a portable personal module (OPM). Each OPM or operator's personal module typically includes a SAM (security application module) which stores the operator's electronic purse, a memory, a CPU and a real time clock.

The operations of the OPM and the TIM are as follows:

a. The TIM is operative to load up a traveler's smart card in response to a driver's actuation. Typically, the driver actuates the TIM to do this in return for receiving X dollars of physical cash. The OPM records the driver's usage of the TIM by decrementing the driver's entitlement to receive cash by X dollars as the driver actuates loading up of a traveler's smart card by X dollars and incrementing the TIM's electronic purse by the same amount.

b. The TIM is operative to issue a paper ticket in response to a driver's actuation. Typically, the driver actuates the TIM to do this in return for receiving the price of the paper ticket from the traveler. The OPM records the driver's usage of the TIM by decrementing the driver's entitlement to receive cash by the price of the paper ticket and incrementing the TIM's electronic purse by the same amount.

c. The TIM is operative to issue multiple or free pass tickets in response to a driver's actuation. Typically, the driver actuates the TIM to do this in return for receiving the price of the desired ticket. The OPM records the driver's usage of the TIM by decrementing the driver's entitlement to receive cash by the price of the desired tickets as the driver actuates loading up of a traveler's smart card by the same price and incrementing the TIM's electronic purse by the same amount.

d. The TIM is operative to decrement a traveler's smart card, in response to insertion of the smart card into the TIM. The smart card may be a card issued by the transportation system, or may be an "external" card such as a conventional credit card. Typically, the driver inputs into the TIM an indication of the nature and/or price of goods or services which the traveler wishes to purchase. The TIM's electronic purse is incremented by the same amount that the traveler's smart card's electronic purse is decremented.

e. The TIM is operative to decrement a traveler's multiple-ride transportation pass, entitling the traveler to a specific amount of transportation service, such as a specific number of rides, in response to insertion of the pass into the TIM. Typically, the driver inputs into the TIM an indication of the nature of transportation services which the traveler wishes to purchase. The TIM's electronic purse is incremented, and the traveler's pass is decremented, by the cost of the service being purchased.

f. The TIM is operative to decrement a traveler's free travel transportation pass, entitling the traveler to an unlimited amount of transportation service, in response to insertion of the pass into the TIM. Preferably, the TIM's electronic purse is incremented, and the traveler's pass is decremented, by a very small sum such that even if the traveler heavily utilizes his pass, nonetheless the pass's electronic purse will not be decremented totally to zero within the time period for which the pass is valid.

Figure 2:
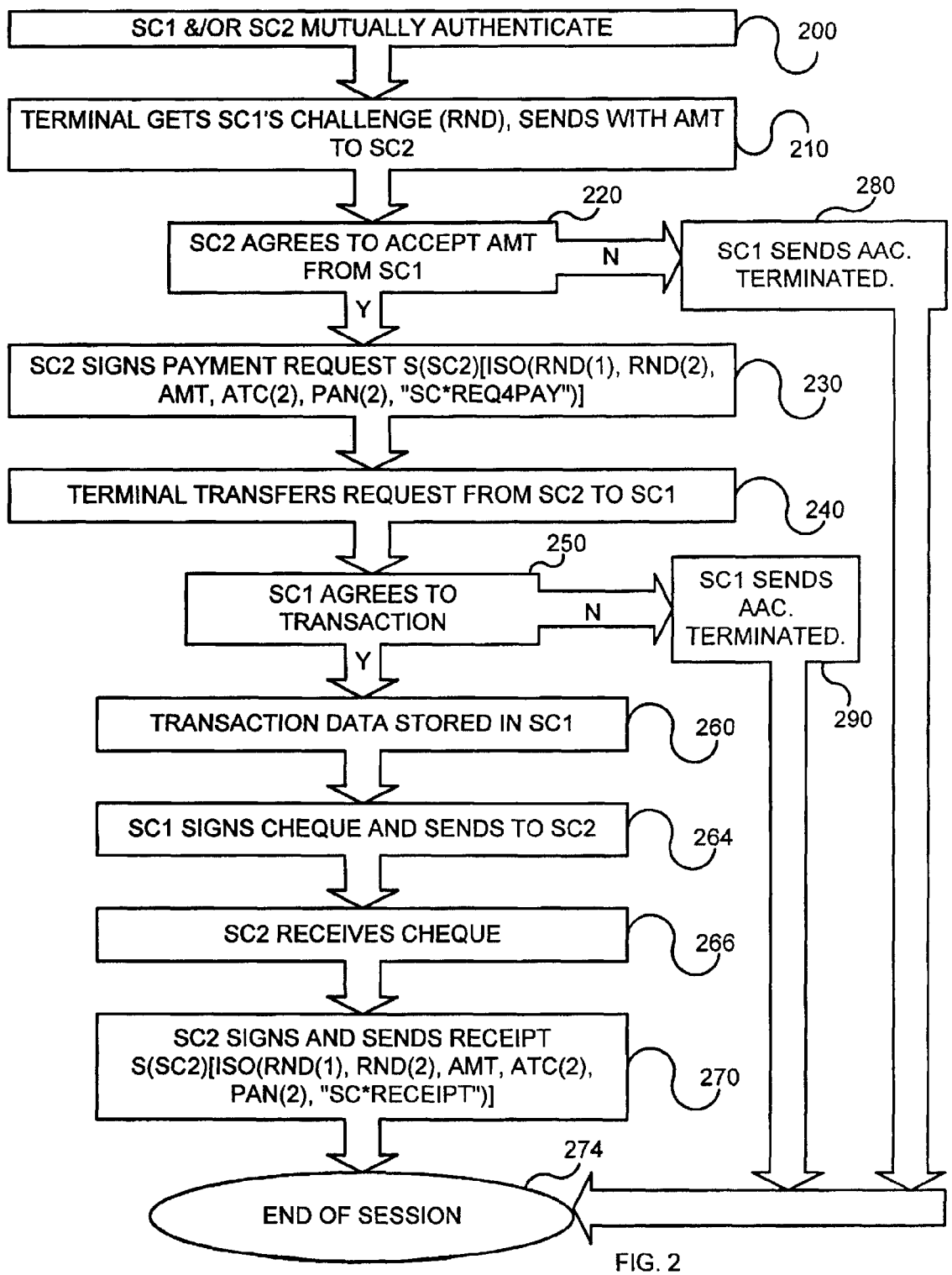
FIG. 2 is a simplified flowchart illustration of a method for performing a purse-to-purse transaction between two operator personal modules (OPMs) of FIG. 1 such as between a driver's OPM and a depot treasurer's OPM or such as between a depot treasurer's OPM and a depot manager's OPM.

FIG. 2 is a simplified flowchart illustration of a method for performing a purse-to-purse transaction between two operator personal modules (OPMs) of FIG. 1 such as between a driver's OPM and a depot treasurer's OPM or such as between a depot treasurer's OPM and a depot manager's OPM. A purse-to-purse transaction is a transaction between two public-key signature secured electronic purses in which value X is transferred from one of the purses to the other, resulting in an decrement of X dollars to the first purse and an increment of X dollars to the second purse.

The transaction illustrated in FIG. 2 takes place between two smart cards or SAMs, SC1 and SC2, and is performed by a terminal having one or more smart card readers. A value designated AMT (amount) is transferred from SC1 to SC2. The transaction initiates with a challenge by SC1 which comprises a random number transmitted to the terminal (step 210). If the receiving smart card SC2 agrees to accept the value being transferred from the donor smart card SC1 (step 220), then precautions are preferably taken to make sure that SC1 is not double-charged. Specifically, SC2 signs and transmits to SC1 a payment request, also termed herein an "RCCCR" (request for cheque for credit for cash receivables) (steps 230 and 240).

If the donor smart card SC1 agrees to comply with the payment request, then SC1 stores the transaction data which appears in the payment request (step 260). SC1 then signs and sends to SC2 a cheque for credit for cash receivables, typically for the amount requested by SC2 (step 264). SC2 receives the cheque (step 266, described in detail below with reference to FIG. 4).

Upon receipt of the cheque, SC2 signs and sends to SC1 a receipt therefor (step 270).

Figure 3:
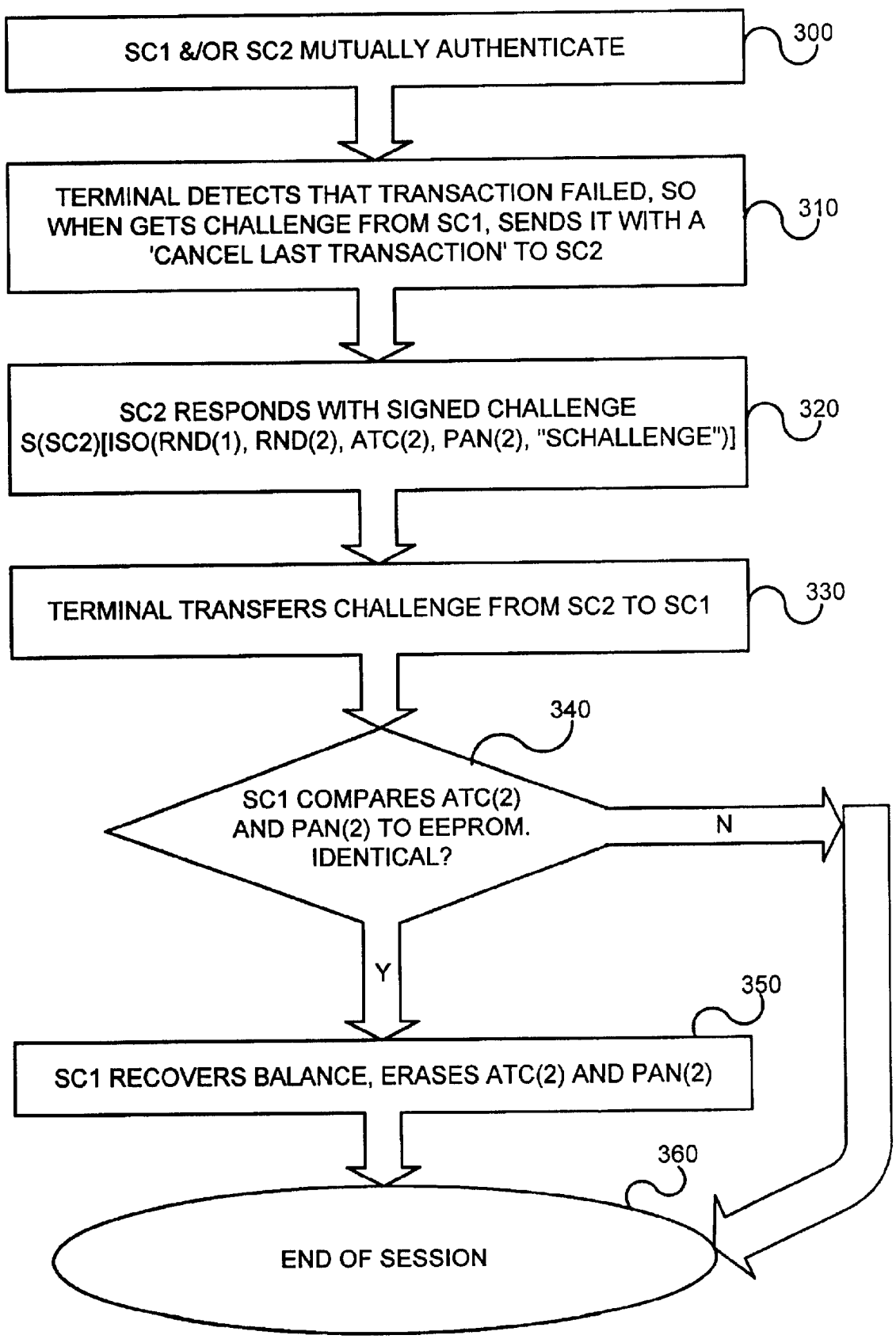
FIG. 3 is a simplified flowchart illustration of a method for canceling the purse-to-purse transaction of FIG. 2 if the purse-to-purse transaction failed.

FIG. 3 is a simplified flowchart illustration of a method for canceling the purse-to-purse transaction of FIG. 2 if the purse-to-purse transaction failed. e.g. that the "end of session" step in FIG. 2 was not reached or As in FIG. 2, SC1 is the donor smart card and SC2 is the intended receiving smart card which does not, in fact, receive any value from SC1 due to failure of the transaction. The terminal may detect that a transaction failed in step 310 in one, some or all of the following ways:

a. The terminal has programmed time limits for response for each of the steps performed by one or other of the smart cards and if these time limits are exceeded, i.e. if either of the smart cards fails to perform on time, the terminal assumes that the transaction has failed;

b. The terminal has a programmed time limit for the "end of session" step 274 of FIG. 2. If the session does not terminate within this time limit, the terminal assumes the transaction has failed; and/or c. The terminal is equipped with microswitches which sense if a card has been removed from the terminal while a transaction is in process.

Figure 4:
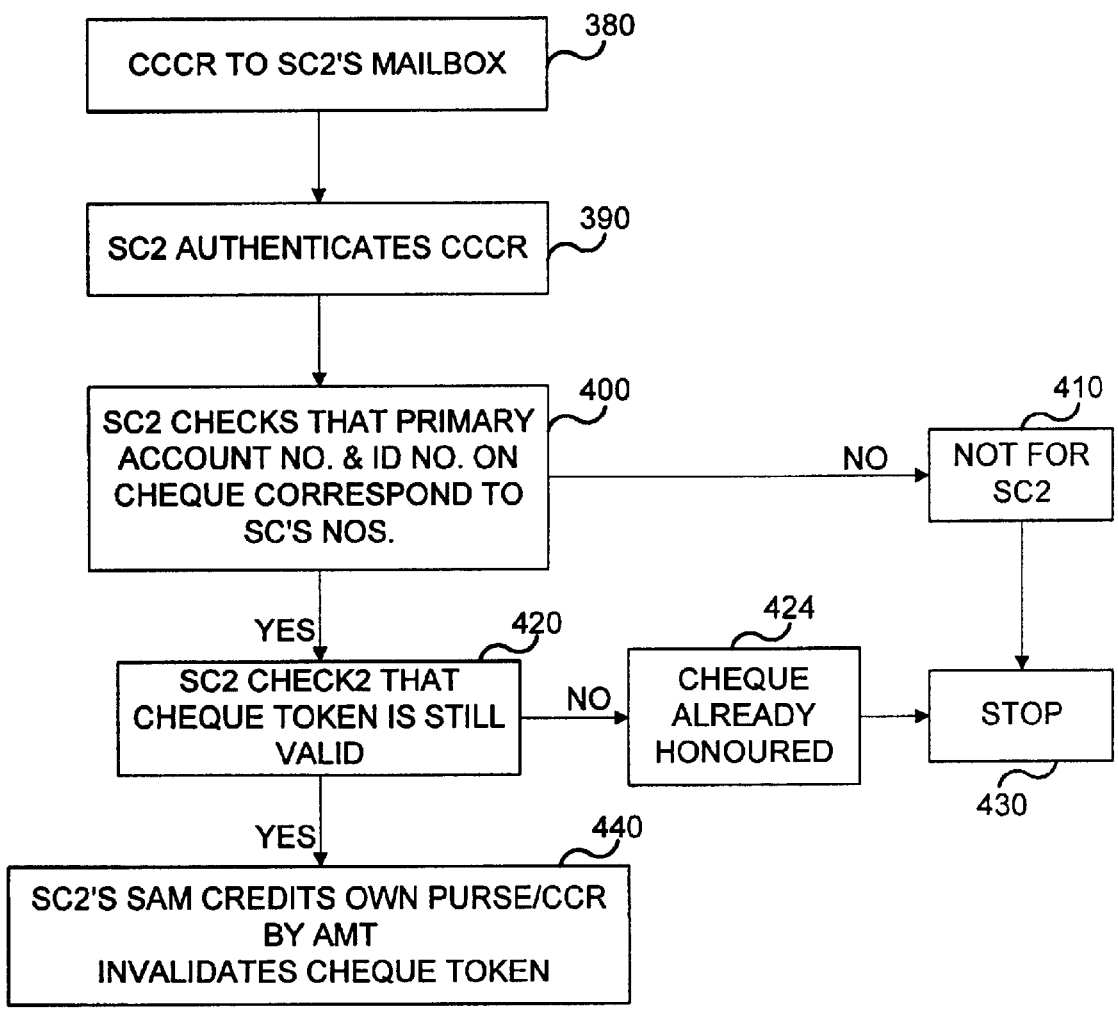
FIG. 4 is a simplified flowchart illustration of a method for performing the cheque receiving step of FIG. 2 for applications in which the cheque for credit for cash receivables is sent without third party clearance.

FIG. 4 is a simplified flowchart illustration of a preferred method by which a receiving smart card, SC2, performs the cheque receiving step 266 of FIG. 2. The embodiment of FIG. 4 is suited for applications in which the cheque for credit for cash receivables (CCCR) is sent without third party clearance. When the method of FIG. 4 is embedded in silicon as externally immutable protocol in public-key signature protected non-volatile memory, third party clearance is not required because the embedded method ensures that the cheque will not be honored more than once.

To ensure that the cheque is not honored more than once, the method of FIG. 4 maintains a binary cheque token within each signed cheque which is maintained as valid until the cheque is honored at which point (step 440) the token is invalidated. The cheque is only honored if (step 420) the cheque token is still valid. The binary cheque token is also termed herein an ATC (application transaction counter).

Figure 5:
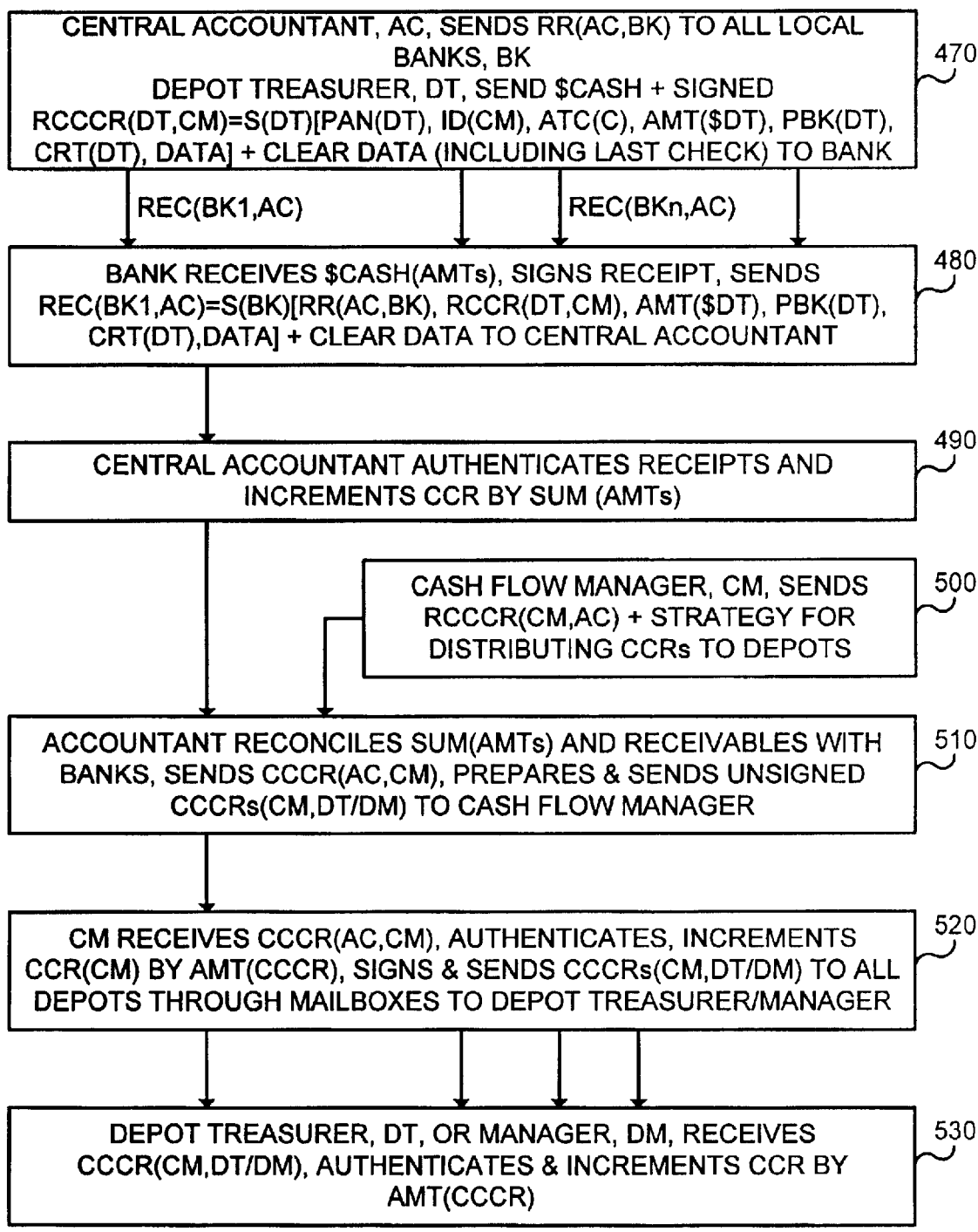
FIG. 5 is a simplified flowchart illustration of a transaction cycle performed by the various elements of FIG. 1.

Reference is now made to FIG. 5 which is a simplified flowchart illustration of a transaction cycle performed by the various elements of FIG. 1.

In step 470, each local bank 80 receives a deposit slip as described above with reference to FIG. 1.

In step 480, the bank 80 may send the central accountant 90 clear redundant data which facilitates authentication procedures, including reconciliation procedures, performed by the central accountant.

In step 490, SUM(AMTs) refers to the sum of amounts of all receipts received by the bank from a plurality of depots.

In step 500, the cash flow manager sends an RCCCR (request for accountant-manager cheque) to the central accountant 90. Preferably, the cash flow manager 100 also sends instructions regarding how to distribute CCRs to depots. For example, if a slow period is anticipated, the instructions may indicate that relatively little CCR should be distributed to the depots, whereas a relatively large amount of CCR may be distributed during the period that monthly passes are sold to travelers.

In step 510, the central accountant preferably performs reconciliation activities before sending an unsigned CCCR to the cash flow manager.

In step 520, the cash flow manager 70 increments his own balance of credit for cash receivables and then sends cheques for credit for cash receivables to all depots, preferably through electronic mailbox 110.

FIG. 5 is slightly different from the embodiment described below which is based on the software listing of Appendix A.

Figure 6:
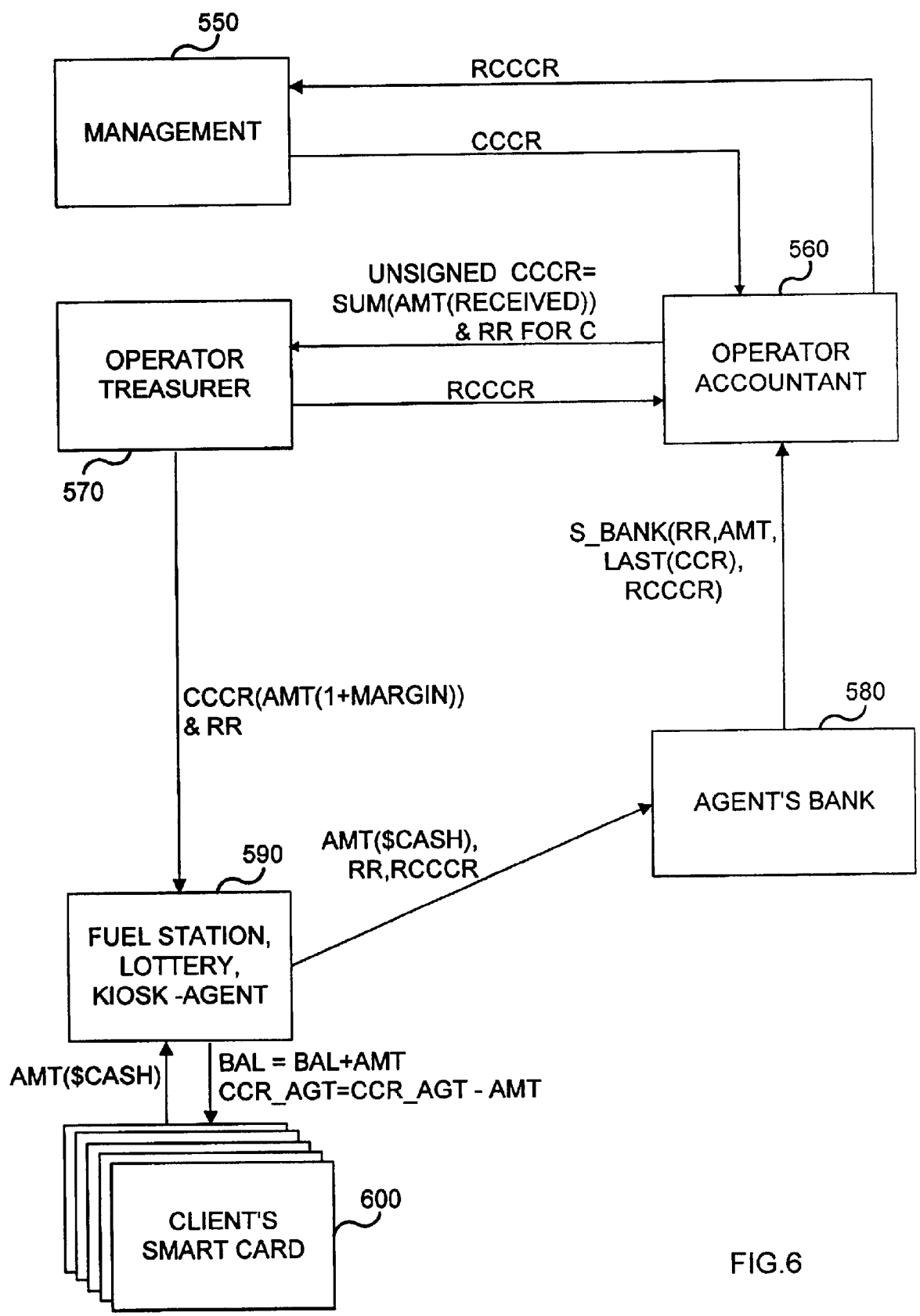
FIG. 6 is a simplified block diagram of a payment collection system constructed and operative in accordance with a preferred embodiment of the present invention which is operative to collect value from smart card bearers (clients) and to load electronic money into the clients' smart cards.

FIG. 6 is a simplified block diagram of a payment collection system constructed and operative in accordance with a preferred embodiment of the present invention which is operative to collect value from smart card bearers (clients) and to load electronic money into the clients' smart cards. The value collected from the clients typically includes physical cash ($Cash), and/or cash equivalents such as a cash advance from a credit card.

The system of FIG. 6 is characterized in that agents typically provide advance payment to management for entitlements to collect cash, rather than the agents receiving entitlement to collect cash without paying for it, and turning in collected cash to management only after it is received. In the embodiment of FIG. 6, the management typically benefits from the float, whereas in the embodiment of FIGS. 1–5 the service providers who collect the cash from the customers and other intermediaries typically benefit from the float.

Each of the following elements is equipped with a SAM: management 550, operator accountant 560, the operator treasurer 570, the bank 580, the agent 590, and the client's smart card 600.

As shown, the operator treasurer 570 preferably provides the agent 590, such as the fuel station or lottery kiosk, a cheque for credit for cash receivables whose value preferably exceeds the total amount provided to the bank 580 by the agent 590 in the previous transaction cycle. Typically, the value exceeds the total amount by a predetermined margin which compensates the entities which handle the cash.

As a result of the discrepancy between the size of the cheque given out and the amount of value collected, it is necessary for management 550 to periodically inject CCR into the system, where CCR refers to an additional entitlement to collect cash. To do this, the management generates a cheque for credit for cash receivables (CCCR) in response to receiving a request therefor.

The embodiment of FIG. 6 is suitable for a wide variety of applications. The population of agents may, for example, comprise any of the following: a population of loading electric meter smart cards, a population of lottery ticket sales points, a population of fuel stations, a population of transportation service providers, and a population of parking meter ticket reloaders.

FIGS. 7–13 illustrate the operation of an electronic value collection device which is operative to collect payment for services rendered or products provided and is also "multi-application" in that it enables value to be transferred between electronic value storing devices such as electronic purses, or electronic credit or debit accounts.

Figure 7:
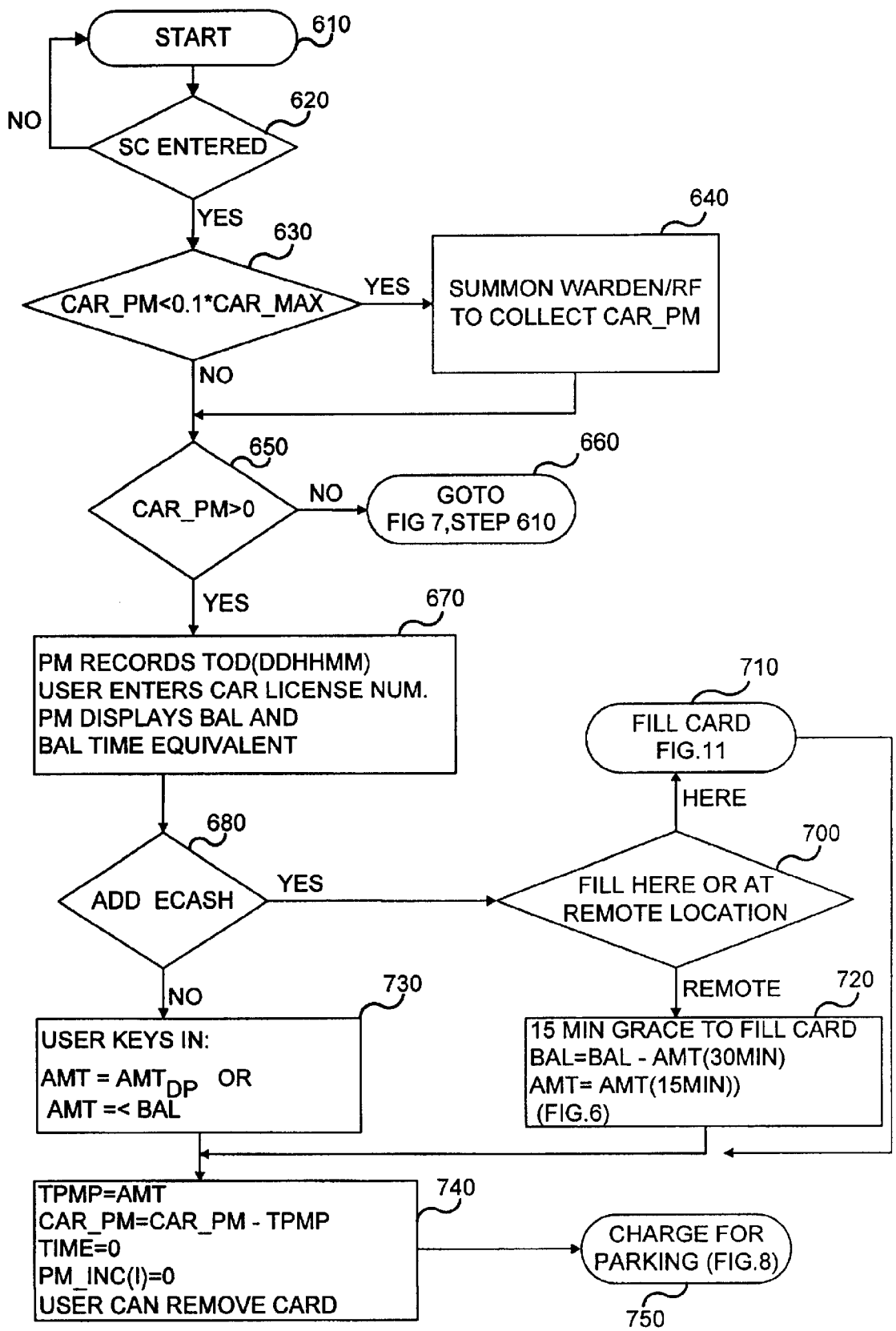
FIG. 7 is a simplified flowchart illustration of the operation of the smart card of FIG. 6, for an application in which the smart card is installed in a parking meter.

FIG. 7 is a simplified flowchart illustration of a method for unloading electronic money from a client's smart card. The implementation of FIG. 7 is, for example, suitable for an interaction between a client's smart card (600 of FIG. 6) and a parking meter in which the parking meter unloads electronic cash from the client's smart card.

In step 620, the parking meter or other device for unloading electronic money waits for a smart card to be inserted Once the smart card has been detected, the meter checks itself to determine its present credit for accounts receivable. If (step 630) its present credit for accounts receivable is lower than a predetermined threshold such as 10% of its maximum entitlement CAR_MAX, then (step 640) the meter typically summons a warden, e.g. by means of an RF (radio frequency) signal, if the warden can be summoned by an RF receiver. The meter then continues to step 650.

If the present credit for accounts receivable is not greater than zero, the method terminates (step 660), because the meter is not operative until the warden unloads the history of all transactions performed by the meter and restores his credit for accounts receivable, typically to CAR_MAX level.

If the present credit for accounts receivable is positive, then (step 670) the parking meter preferably records the time of day, the user preferably enters user-identifying information such as his license plate number, the meter displays the balance of electronic cash possessed by the smart card inserted and/or the amount of parking time equivalent thereto.

According to a preferred embodiment of the present invention, the meter is operative to enable a user to accumulate a small over-draft, corresponding to a brief interval of time, also termed herein a grace period, during which the user can approach an electronic cash sales point and have his smart card, if empty or near empty, reloaded as described above with reference to FIG. 6. Alternatively, the reloading process may be performed by a conventional AIM (automatic teller machine). Typically, the grace period is charged at a higher rate than ordinary parking time.

In step 680, the meter generates a display prompting the user to indicate a desire to increment his balance of electronic cash. If the user indicates such a desire then (step 700) the user is prompted to indicate whether to increment his balance of electronic cash at the parking meter or at a remote location such as a human-operated or electronically operated electronic cash dispensing point.

If the user indicates a desire to increment his electronic cash balance "here", then the parking meter increments his electronic cash balance (step 710) using any suitable method such as the method described below with reference to FIG. 11.

If the user indicates a desire to increment his electronic cash balance elsewhere, then (step 720), the parking meter starts a timer which is programmed to indicate a short grace period. The user removes his smart card and approaches an electronic cash dispensing point which dispenses electronic cash, preferably as described herein with reference to FIG. 6. The user then returns to the parking meter and re-inserts his card as described below with reference to FIG. 9.

If (step 680) the user indicates that he does not wish to increment his electronic cash balance then the parking meter merely debits the user's electronic cash balance as payment for the parking service which the user is about to avail himself of.

In step 730, the user is preferably prompted to indicate how much electronic cash value he wishes to be debited by. Preferably, the parking meter is configured to accept either of the following two user responses:

a. An indication that the user wishes to leave a deposit equivalent in value to an entire day's parking or b. An indication of a value which the user wishes to be debited by.

Charging of that value (step 750) is performed as described below in FIGS. 8A–8B, following an initialization step 740.

Figure 8A:
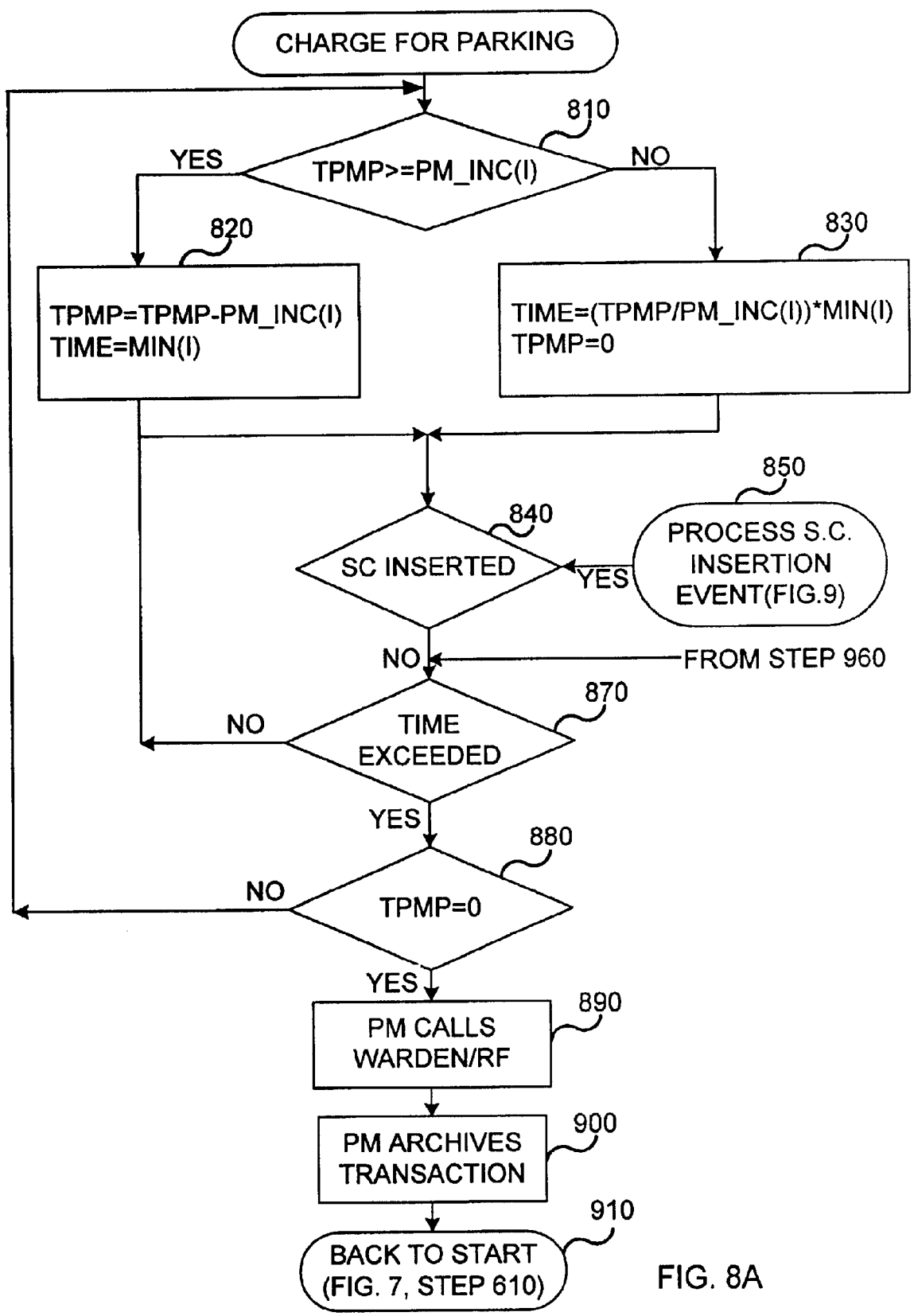
FIG. 8A is a simplified flowchart illustration of a preferred method for performing the "charge for parking" step 750 of FIG. 7.

FIG. 8A is a simplified flowchart illustration of a preferred method for performing the "charge for parking" step 750 of FIG. 7.

When a driver leaves electronic cash in the parking meter, this electronic cash is preferably stored in a temporary purse (also termed TPMP—temporary parking meter purse) and is preferably only used to increment the parking meter's accounts receivable as parking time is used in actual fact. Any electronic cash remaining in the temporary purse is returned to the driver's electronic cash purse when the driver returns and inserts his smart card into the parking meter, as described herein with reference to FIG. 9.

In step 810, the parking meter determines whether the balance of electronic cash left in its temporary purse by the driver is sufficient to completely pay for the next time-interval of parking in a predetermined sequence of parking time-intervals. FIG. 8B is a sample table storing two sequences of parking time-intervals. The parking meter can preferably be programmed to employ either of the two sequences. The first sequence is suitable for busy parking locations in which it is desired to strongly deter drivers from parking for periods longer than a few minutes. The second sequence is suitable for ordinary parking locations in which it is desired to only mildly deter drivers from parking for more than a few hours. For each parking time interval in each of the tables, the following information is stored: the length of the time interval, and the cost of parking during that time interval.

If the balance of electronic cash left by the driver is sufficient to completely pay for the next time-interval, the parking meter decrements the temporary purse accordingly (step 820). If the balance of electronic cash is not sufficient to completely pay for the next time interval, the temporary purse is zeroed and the amount of time which the temporary purse if capable of paying for is computed.

Figure 9:
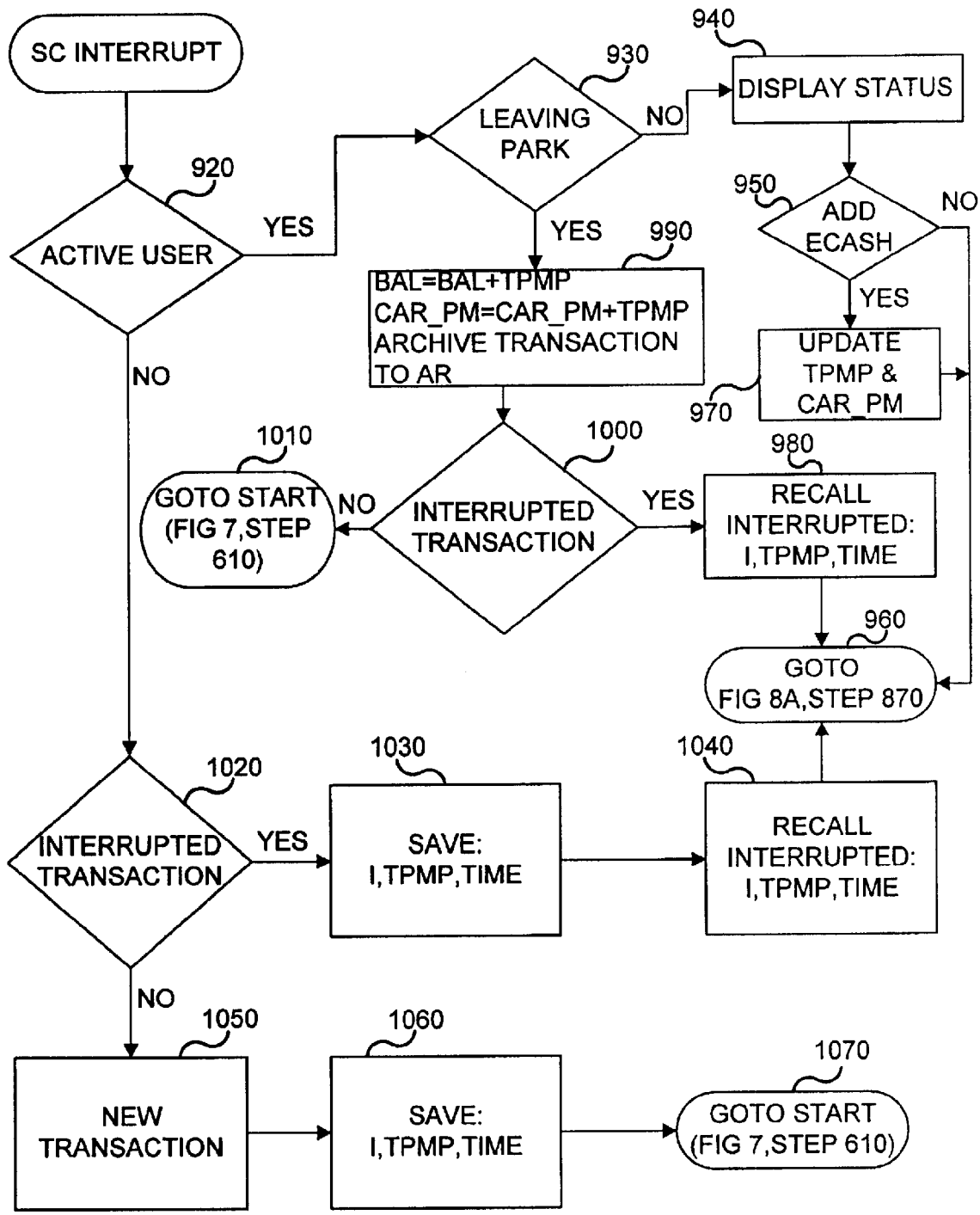
FIG. 9 is a simplified flowchart illustration of a preferred method for performing the "process smart card insertion event" step of FIG. 8A.

If the smart card is inserted at this point (step 840), the method of FIG. 9 is carried out to process this interrupt. Otherwise, the method continues to step 870 in which the parking meter determines by consulting its timer whether the present time interval has elapsed. If not, the method continues to wait for the driver's return or for the current parking time interval to elapse. If the present time interval has elapsed then (step 880) the parking meter determines whether the temporary purse is already empty. If not, the parking meter returns to step 810 and transfers from the temporary purse to its accounts receivable, the amount of value required to pay for the next parking time interval.

If the temporary purse is found to be empty, the parking meter calls the warden using its radio transmitter (step 890), preferably archives the transaction (step 900) and returns to the beginning of FIG. 7 to await the next driver's smart card.

FIG. 9 is a simplified flowchart illustration of a preferred method for performing the "process smart card insertion event" step 850 of FIG. 8A. The method of FIG. 9 preferably includes the following steps:

The parking meter compares the inserted smart card's ID number to the ID number of the currently-parking smart card to determine whether the smart card now inserted belongs to the currently parking vehicle or individual. If so, then the parking meter prompts the user to indicate whether or not he is leaving the parking area.

Figure 10:
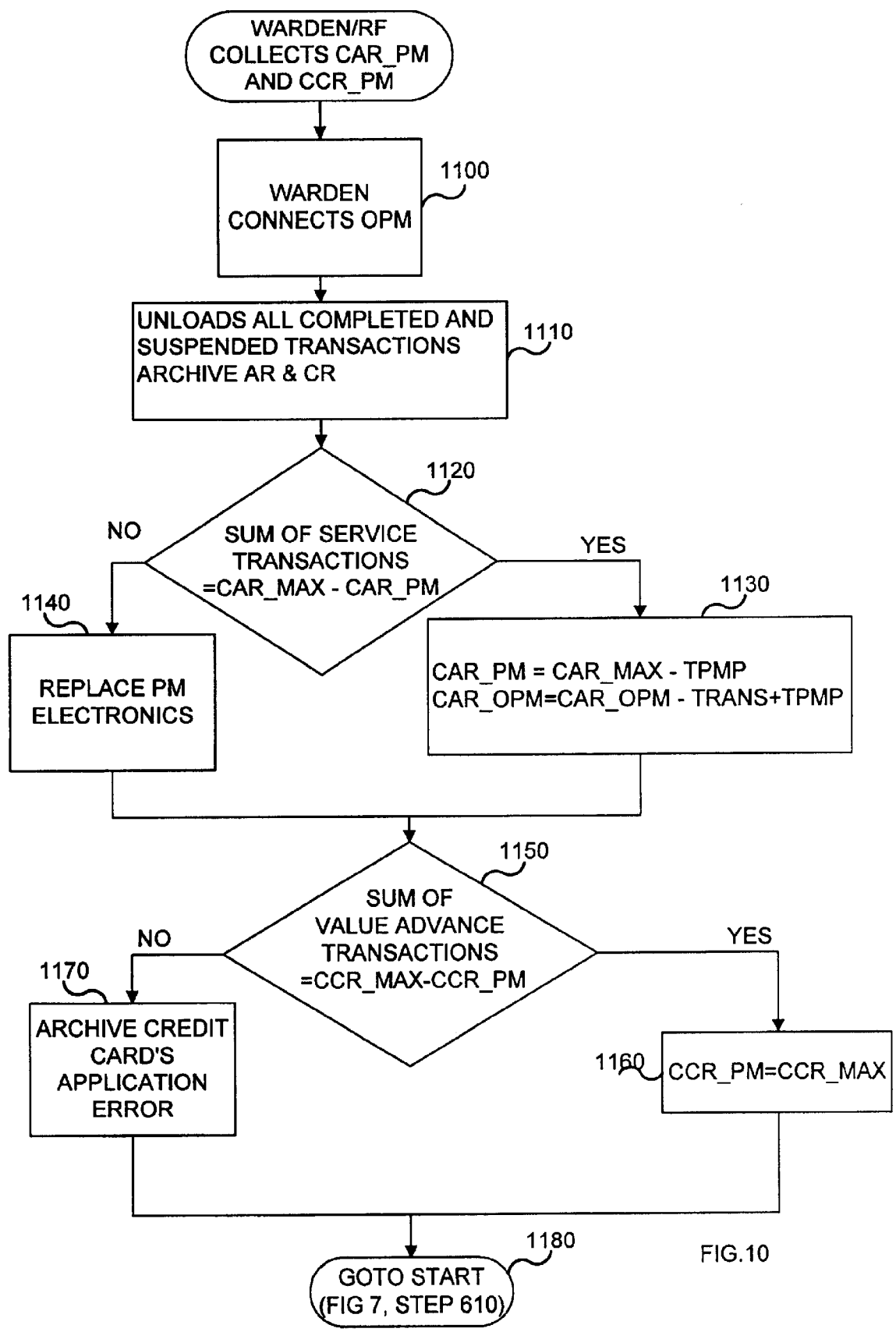
FIG. 10 is a simplified flowchart illustration of a preferred method of operation for a warden summoned by the method of FIG. 7.

FIG. 10 is a simplified flowchart illustration of a preferred method of operation for a warden's SAM (security application module) once the warden has been summoned by the method of FIG. 7 to restore a parking meter's credit for cash receivables and to collect accounts receivable accumulated in the parking mater by unloading particulars of all completed and suspended transactions.

In step 1100, the warden connects his OPM (operator personal module), which includes a SAM and a memory, to the parking meter.

In step 1110, all completed and suspended transactions are unloaded into the OPM's memory.

In step 1120, the difference between the parking meter's maximum entitlement to collect electronic cash in return for services rendered (maximum credit for accounts receivable—CAR_MAX) and between the parking meter's present balance of entitlement is compared to the sum of service transactions carried out by the parking meter since the parking meter was last accessed by a warden.

The term "service transactions" refers to transactions in which payment is made for services rendered or, in certain applications, for products received. Conversely, the term "value advance transactions" refers to transactions in which value is transferred between electronic value storing devices, such as between a multi-purpose credit card and a single-application electronic purse.

If these two electronic cash quantities are found to be equal, then (step 1130) the current balance is restored to, i.e. incremented to, CAR_MAX level, less the amount of electronic cash presently stored in the parking meter's temporary purse. The warden's entitlement to collect electronic cash, CAR_OPM, conversely, is decremented by the amount of account collection entitlement which was conferred on the parking meter.

If the comparison of step 1120 does not yield the expected equality, this is symptomatic of malfunctioning of the parking meter and the parking meter electronics is typically replaced (step 1140).

In step 1150, the warden's OPM then compares the sum of value advance transactions performed by the parking meter since it was last warden-accessed to the difference between the parking meter's maximum credit for cash receivable and between the parking meter's current balance of credit for cash receivable.

If the two quantities are equal, as expected, then (step 1160) the parking meter's current balance of credit for cash receivable is incremented to a predetermined maximum level. If the two quantities are not equal, the error is archived (step 1170). The method then returns to step 610 of FIG. 7.

Figure 11:
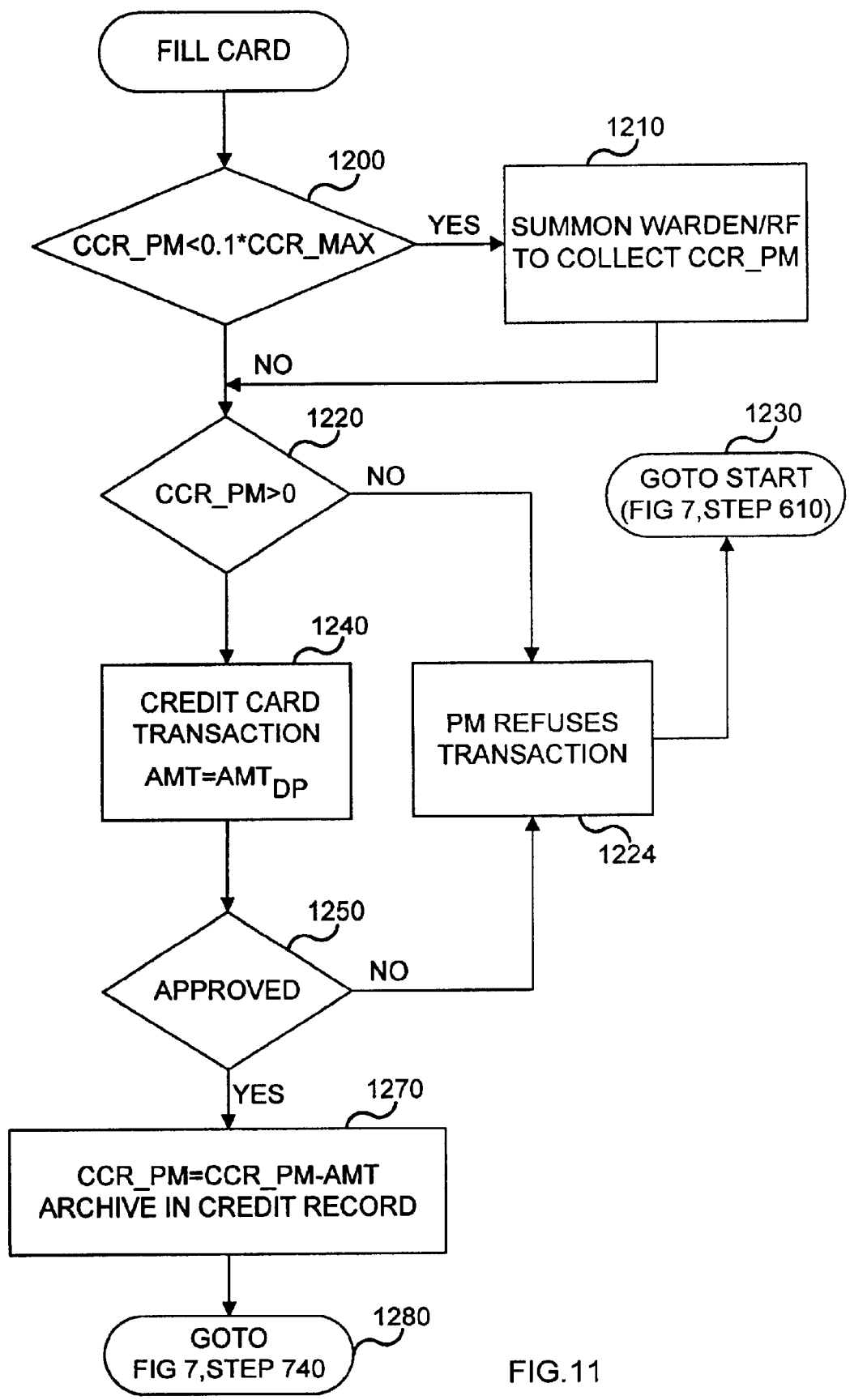
FIG. 11 is a simplified flowchart illustration of a preferred method for incrementing the electronic cash balance of a user's card.

FIG. 11 is a simplified flowchart illustration of a preferred method for incrementing the electronic cash balance of a user's card. The method of FIG. 11 preferably includes the following steps:

Step 1200—If the parking meter's credit for cash receivables has dropped below a predetermined threshold quantity, then (step 1210) the warden is summoned to access the parking meter, to collect the credit for cash receivables and subsequently restore the parking meter's credit for cash receivables to a predetermined maximum value.

Step 1220—If the parking meter's entitlement to collect electronic cash is no longer positive, the transaction is refused (step 1224) and the method returns to step 610 in FIG. 7. If the parking meter's entitlement is positive, Step 1240—the parking meter accepts electronic value equivalent, in the illustrated embodiment, to a full day's parking. Alternatively, of course, different electronic value equivalents, such as a user selected amount of electronic value, may be accepted.

Step 1250—Typically, at least one aspect of the transaction is investigated such as the legitimacy of the user's signature as received by the parking meter, or the credit status of the user. If the investigated aspect/s of the transaction are not approved, the method returns to step 610 of FIG. 7. If the investigated aspect/s of the transaction are approved, the parking meter accepts the amount of payment provided by the user,lowers its own credit for cash receivables by the same amount, and archives a record of the transaction (step 1270). The method then returns to step 740 of FIG. 7.

Figure 12:
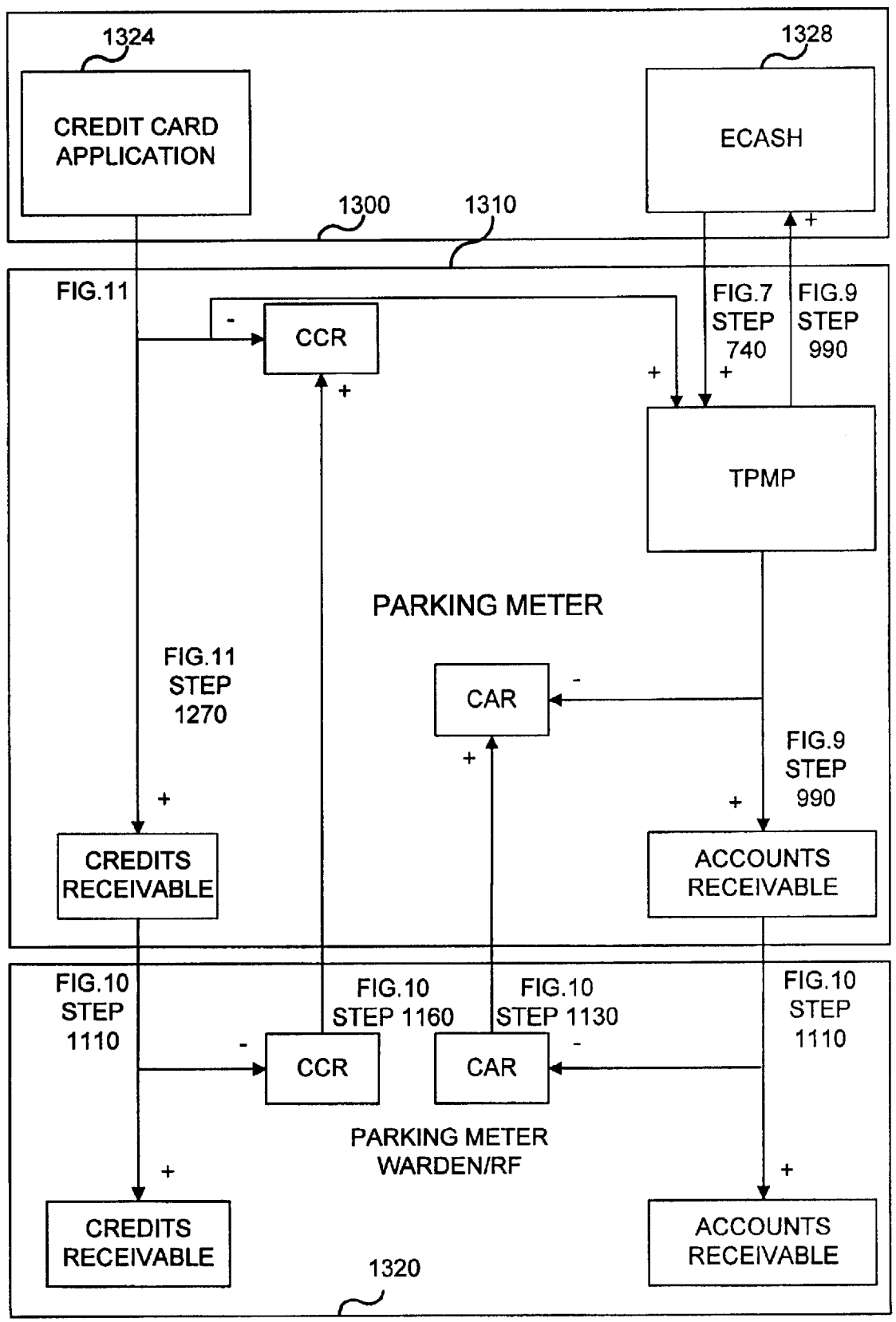
FIG. 12 is a pictorial diagram illustrating the flow of electronic value between a user's smart card/s, a parking meter's SAM and a parking warden's OPM.

FIG. 12 is a pictorial diagram illustrating the flow of electronic value between a user's smart card/s 1300, a parking meter's SAM 1310 and a parking warden's OPM 1320. A minus sign associated with a vertical arrow head adjacent a particular electronic value holding device indicates that that device is decremented by a particular electronic value quantity and the electronic value holding device at the base of the same vertical arrow is incremented by the same amount. Conversely, a plus sign associated with a vertical arrow head adjacent a particular electronic value holding device indicates that that device is incremented by a particular electronic value quantity and the electronic value holding device at the base of the same vertical arrow is decremented by the same amount.

It is appreciated that the credit card application 1324 and electronic cash application 1328 may reside on a single smart card or on different smart cards which typically are owned by a single owner.

Horizontal arrows whose head is associated with a minus sign indicate that, concurrently with the transaction indicated by the vertical arrow which intersects the horizontal arrow's base, the electronic value holding device associated with the horizontal arrow's head is decremented. Conversely, horizontal arrows whose head is associated with a plus sign indicate that, concurrently with the transaction indicated by the vertical arrow which intersects the horizontal arrow's base, the electronic value holding device associated with the horizontal arrow's head is incremented. Electronic counters can be regarded as residing at the bases of the horizontal arrows in order to count electronic value passing through the vertical arrow intersecting with each horizontal arrow base, thereby to determine the quantity of electronic value by which the device at the horizontal arrow's head should be incremented or decremented.

Figure 13:
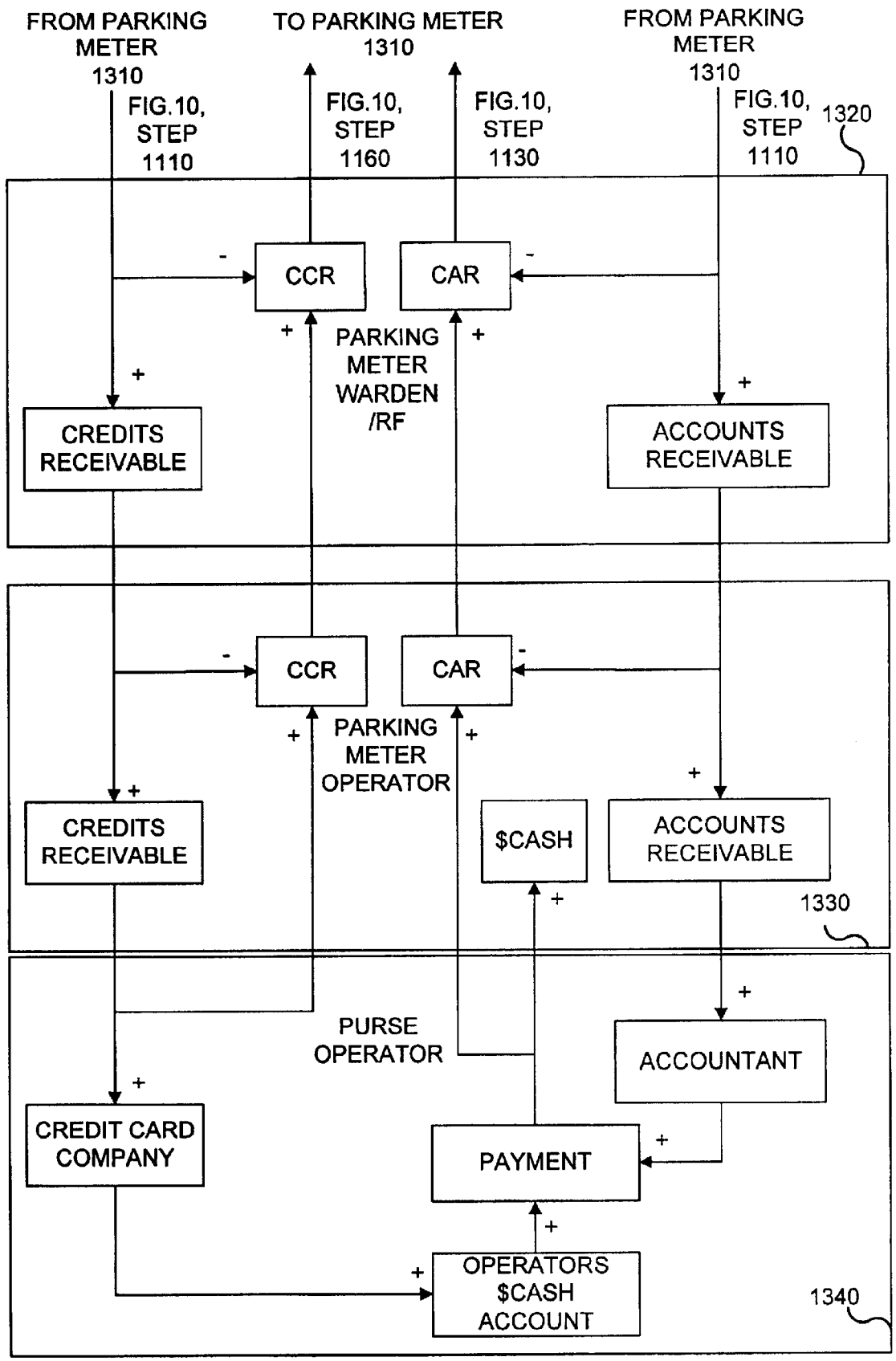
FIG. 13 is a pictorial diagram illustrating a preferred flow of electronic value between a parking warden's OPM, a parking meter operator, and a purse operator.

FIG. 13 is a pictorial diagram illustrating a preferred flow of electronic value between a parking warden's OPM 1320, a parking meter operator 1330, and a purse operator 1340. The significance of horizontal arrows and vertical arrows, plus and minus signs are as described above with reference to FIG. 12.

It is appreciated that the warden need not be a human operating a SAM who is summoned by means of an RF transmitter. Alternatively, the transactions described herein may be performed by a central electronic warden using any suitable means of communication such as RF communication.

A preferred feature of the present invention is that each of the methods and devices of FIGS. 1–13 are embedded in silicon as externally immutable protocol in public-key signature protected non-volatile memory. Conventional secured silicon architectures include the following integrated circuits: Motorola SC29, Motorola SC49 and SGS-Thomson CF54. A preferred method for embedding the methods and devices of FIGS. 1–13 in silicon as externally immutable protocol in public-key signature protected non-volatile memory, is to use the SCAD developing system, marketed by Fortress U & T. Ltd., Beer Sheva, Israel, in conjunction with one of the above-mentioned integrated circuits in which is programmed the SCOS++ operating system. A preferred method for manufacturing a safe payment collection system constructed and operative in accordance with a preferred embodiment of the present invention is based on Appendix A.

To implement the Transaction Terminal as here described, the following standard configuration of the SCAD may be employed:

A. 'BestCRYPT 4 PC' peripheral cards for each terminal configured with the SCAD Application Developer, each with two Amphenol 3.5" smart card acceptors (catalog number C702)—Reader A and Reader B.

B. System owner smart card—an SGS-Thomson CF54 chip masked with the SCOS+ operating system configured with the SCAD Application Developer. SGS-Thomson CF54 chip masked with the SCOS+ operating system smart-cards, used for system operators and clients' smart-cards which are configured with the SCAD Application Developer.

C. The complete standard SCAD software module setup disks for the SGS-Thomson CF54 cryptocomputer chip which includes the optional SCAD Microsoft Visual Basic source module APPMODUL.BAS.

D. Appendix A contains source code listing and specifications for MS Visual Basic form object 'PRFM_TRN.FRM' useful for the Cashflow Terminal implementation.

Figure 14:
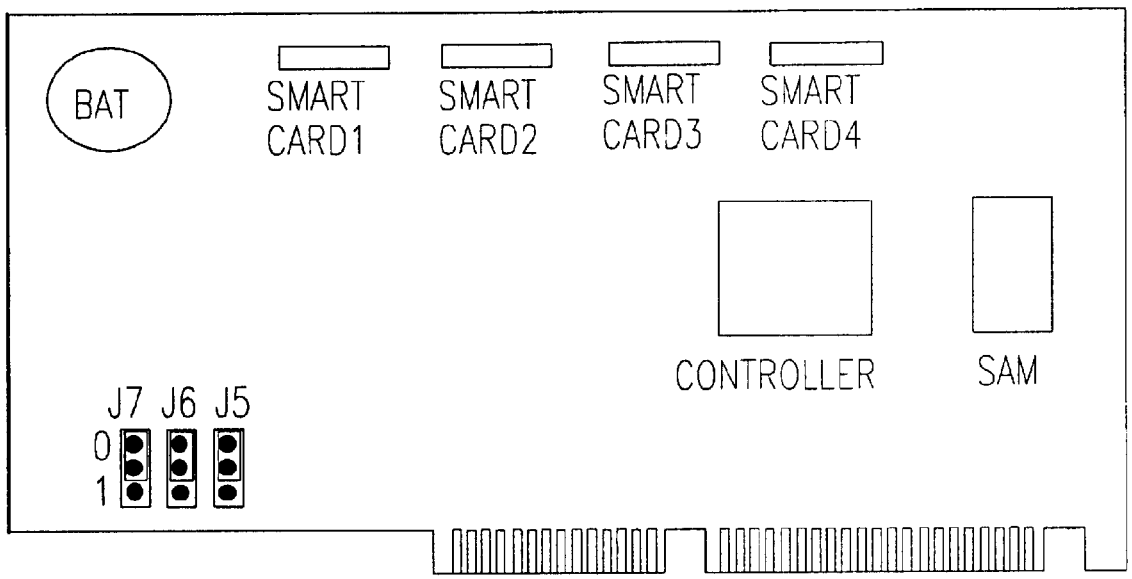
FIG. 14 is an illustration of a public key authentication hardware interface supporting up to four smart card readers which is useful in one implementation of the present invention.

Now, the correct address of the 'BestCRYPT 4 PC' peripheral card is set, and smart card acceptors are connected to it. See FIG. 14 for a general view of 'BestCRYPT 4 PC', commercially available from Fortress. SMART-CARD1–4 are the Smart-card reader connectors. Reader A should be attached to SMARTCARD1 and reader B to SMARTCARD2. Wires should point away from the 'BestCRYPT 4 PC' card, i.e., red wire on smart card reader cable, should be placed opposite to the battery (BAT). J5–J7 are the Address jumpers. All jumpers must be present to set an address. Each jumper can be positioned on an upper ('0') or lower ('1') position. There are eight different base addresses, in which the card may be installed, displayed in the following table:

J7 J6 J5 Address
0 0 0 200h (Factory setting)
0 0 1 220h
0 1 0 240h
0 1 1 260h
1 0 0 300h
1 0 1 320h
1 1 0 340h
1 1 1 360h To install the hardware correctly in a PC, the following steps may be performed:
a. Turn off the PC.
b. Disconnect the power cord from the PC.
c. Take off the cover of the PC, to provide easy access to the mother board.
d. Find a free 16 bit IDE slot, and plug the 'BestCRYPT 4 PC' card in. Use a screw to tighten the card.
e. If necessary, set the desired address on the 'BestCRYPT 4 PC' card, using jumpers J5–J7, as presented above. The address should be set to the lowest address which does not interfere with other installed peripheral equipment on the PC.
f. Screw in the two smart card acceptors. Use the 5.25" adapter, if necessary.
g. Connect the smart card acceptor cables to the 'BestCRYPT 4 PC' card, according to the instructions in the 'setting the hardware' section.
h. To install the smart card readers; Install the smart card reader A in an upper floppy slot; and reader B in a lower floppy slot.
i. Cover the PC and connect the power cord.
j. Turn the PC on. Check if operation is normal. If not, or the PC speaker beeps more than once, when powered on, turn off the computer and refer to the 'Trouble shooting' section below.

Note: The 'BestCRYPT 4 PC' card contains a SAM (Security Application Module). The location of the SAM is shown on the view of 'BestCRYPT 4 PC' card of FIG. 14. The SAM is an important part of the system and its removal or modification may cause a system failure.

To install the software correctly in the PC:
a. Activate Windows operating system version 3.11 or later on the PC.
b. Run SETUP.EXE from setup disk number 1.
c. Follow setup program instructions.
d. The installation directory may be modified if desired by the installer.
e. If Setup was not completed successfully refer to Trouble shooting section below.
f. The PRFM_TRN.FRM and APPMODUL.BAS specified previously are linked and compiled using the Microsoft Visual Basic development environment to create a single executable (.EXE) file named TRANSACTOR.EXE This generates a complete Transaction Terminal for controlling value flow.
g. The TRANSACTOR.EXE is run under Microsoft Windows version 3.11 or later by double clicking 'TRANSACTOR.EXE' in the Microsoft Windows File Manager.

Before the Transaction Terminal can be run, the system users are defined, i.e. the various system smart-cards are assigned their definitions. This is performed using the SCAD Application Developer modules. The SCAD Application Engine is used for creating the application definitions, and the SCAD Issuing Station enables the system manager to issue the smart-cards for the system, as described in FIG. 16. Once the smart-card is issued, it is a secured information environment subject to the application authorization and restriction, modified only if re-issued by the system manager.

The User defined priority types used by the Transaction Terminal are:
Accountant
Cashflow Manager
Bank Teller
Depot Manager
Depot Treasurer
Branch Cashier
OPM TIM Client A card not belonging to any of these users will not have access to any purse in the Transaction Terminal. Any SCAD Application defined with users from the list above will have access to the Transaction Terminal purses.

The system is initialized by entering an initial Cash for Credit Receivables amount, CCR, to the central accountant purse balance. This process can only be executed in the SCAD File Management work station by the system owner. Without this initialization, no CCR type credits exist within the system.

All transactions take place with smart-cards inserted in terminal readers, A and B. Transactions are governed by the SAM terminal and by predetermined external smart-cards SCOS authorizations. If the cards executing a transaction have no proper authorization, security or incompatibility errors occur; appropriate messages are sent to the terminal operator. The smart-card's details i.e. the user type, name, ID and validity dates are displayed during transaction execution. Execution takes place after the user selects the transaction type from the options once [Execute] is clicked. At the end of each transaction a message is sent containing success or failure information and current purse status details (balance). Any RR, RCCCR, Bank approval, or CCCR dispatched to the terminal can be viewed by entering the appropriate folder in the main transaction window, as shown in FIG. 15.

Credit for Cash Receivables: This command generates a purse to purse transaction which increments the CCR of the smart-card purse in reader B and decrements the CCR of the smart-card purse in reader A. After recipient and donor cards are inserted, the operator enters the amount to be transacted, donor gives $CASH to recipient, and the operator clicks [Execute] to perform the CCR transaction. The users' details are displayed on the screen, and if the users are properly authorized, the transaction takes place with a proper message.

Generate Request for CCCRs: This command generates a Request for a Cheque for Credit for Cash Receivables, RCCCR, and dispatches it. The operator inserts the recipient smart-card in reader A and enters the amount requested in the amount textbox.

Generate Request for receipt: This command generates a Request for Receipt, RR. RRs can be generated only by the central accountant and the card inserted in A is verified as such. If authorized the RR is formatted signed and dispatched.

RCCCR bank receipt: To approve a treasurer's "deposit slip" the bank teller's smart-card must be inserted in reader A, after selecting the proper RR and RCCCR in the RR folder. The RR and RCCCR selected will be signed together and dispatched. The CCR amount sent with the approval is the amount entered in the amount textbox.

Accountant's converting deposit to CCRs: Accountant's card in A is credited with CCRs of all valid and dispatched bank approved RCCCRs (receipts). The card in A will be credited only if it is the central accountant card's and only with approvals not obsolete and not deposited previously. All deposited approvals are moved to the accountant's terminal for RCCCR dispatching to the cashflow manager.

Send Cheque (CCCR): To generate a CCCR, an RCCCR must first be selected from the RCCCR folder to be used as the destination for the CCCR. The CCR of the cheque sender (the donor) in reader A is charged with the amount specified in the amount textbox, set by the sender of the cheque, and the cheque is dispatched.

Deposit Cheque (CCCR): The command to deposit a received CCCR. Deposit dispatched CCCR. User in reader A selects a dispatched CCCR from the CCCR folder. If authorized and if the cheque is valid, sent to the proper recipient, and contains a valid ATC; the user's purse is credited.

Trouble shooting: 1. (Q) The available addresses on the PC are unknown. (A) Check the other hardware that is currently installed on the PC. Make a list of the addresses other peripherals occupy, and find a free base address for the 'BestCRYPT 4 PC' card. If unable to list, try installing the 'BestCRYPT 4 PC' card, using the factory setting.

2. (Q) During the installation process, a file sharing error has occurred ('File already opened' or 'Can not access file').
    (A) The installation program can not access files that are being used by other applications. When installing the software, quit all open applications to avoid conflict. Then try installing the software again.
3. (Q) The installation program declares that the 'Best-CRYPT 4 PC' card was not found.
    (A) This could be caused by several reasons: The card was not properly installed. The base address that was set by J5–J7 is occupied by other hardware. The card is missing or damaged. Turn off the PC, take off the cover and check if the card is installed properly.

Refer to the answer to (1), and check if the address selected is free.

4. (Q) When running the SCAD issuing station, or the SCAD file management work station, there is a 'File not found' message.
    (A) This message indicates that the 'BestCRYPT 4 PC' card was not installed properly. Refer to previous answers for help.
5. (Q) The SCAD is installed, but the application engine does not start. The error message says: "Application owner card not in A:".
    (A) Check if the application owner card is inserted in reader A, and that it is properly inserted, i.e., gold contacts facing upwards. If this does not solve the problem, turn off the PC, take off the cover and check if you have connected the smart-card reader wires properly, as per hardware installation instructions.
6. (Q) The SCAD has been installed, operated for a period of time, but suddenly causes problems involving the system clock.
    (A) Try setting the system clock, using the application engine software and the application owner card, and then turn the computer off, turn it on and read the system clock setting. If the clock is reset when read, it means that the 'BestCRYPT 4 PC' card backup battery is discharged. In this case, replace it with a similar battery, or reset the clock when running the PC.

It is appreciated that the software components of the present invention may, if desired, be implemented in protected externally immutable ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A system for safe collection of payment by a vehicle operator from riders, the system comprising:
    a multiplicity of electronic payment receipt generators, each operable by a vehicle operator, wherein each individual one of the payment receipt generators includes an electronic purse storing an amount of electronic cash, each electronic purse including:
        an electronic cash loader operative to generate a payment receipt to be given by the vehicle operator to a rider; and
        an electronic purse control unit operative to prevent said electronic cash loader from exceeding said amount of electronic cash, thereby limiting the vehicle operator's entitlement to collect payments from riders; and
        an electronic cashier purse operative to increment the electronic purse of each electronic payment receipt generator by the amount of payment collected by the vehicle operator to whom the electronic payment receipt generator is assigned.

2. A system according to claim 1 wherein each of said purses includes a SAM (security application module).

3. A system according to claim 1 wherein each purse control unit is public-key protected.

4. A system according to claim 1 and wherein said multiplicity of payment receipt generators communicate with said electronic cashier purse in an encrypted manner.

5. A system according to claim 4 and wherein said multiplicity of payment receipt generators communicate with said electronic cashier purse by employing public key cryptographic signatures.

6. A method for safe collection of payment by a vehicle operator from riders, the method comprising:

providing a multiplicity of electronic payment receipt generators, each operable by a vehicle operator, wherein each individual one of the payment receipt generators includes an electronic purse storing an amount of electronic cash;

generating a payment receipt given by the vehicle operator to a rider;

preventing the total amount of payment receipts from exceeding said amount of electronic cash, thereby limiting the vehicle operator's entitlement to collect payments from riders; and incrementing the electronic purse of each electronic payment receipt generator by the amount of payment collected by the vehicle operator to whom the electronic payment receipt generator is assigned.

7. A method according to claim 1 and wherein said multiplicity of payment receipt generators communicate in an encrypted manner.

8. A method according to claim 1 and wherein said multiplicity of payment receipt generators communicate by employing public key cryptographic signatures.

* * * * *